(12) United States Patent
Chan et al.

(10) Patent No.: US 12,141,803 B2
(45) Date of Patent: Nov. 12, 2024

(54) RANDOM NUMBER GENERATION IN A BLOCKCHAIN

(71) Applicant: nChain Licensing AG, Zug (CH)

(72) Inventors: Ying Chan, Cambridge (GB); Dean Kramer, London (GB)

(73) Assignee: nChain Licensing AG, Zug (CH)

( * ) Notice: Subject to any disclaimer, the term of this patent is extended or adjusted under 35 U.S.C. 154(b) by 446 days.

(21) Appl. No.: 16/638,686

(22) PCT Filed: Aug. 13, 2018

(86) PCT No.: PCT/IB2018/056087
§ 371 (c)(1),
(2) Date: Feb. 12, 2020

(87) PCT Pub. No.: WO2019/034983
PCT Pub. Date: Feb. 21, 2019

(65) Prior Publication Data
US 2021/0192498 A1    Jun. 24, 2021

(30) Foreign Application Priority Data

Aug. 15, 2017 (GB) ...................................... 1713084
Aug. 15, 2017 (GB) ...................................... 1713086

(51) Int. Cl.
*G06Q 20/40* (2012.01)
*G06F 16/23* (2019.01)
(Continued)

(52) U.S. Cl.
CPC ....... *G06Q 20/401* (2013.01); *G06F 16/2379* (2019.01); *G06Q 10/10* (2013.01);
(Continued)

(58) Field of Classification Search
CPC .... G06Q 20/401; G06Q 10/10; G06Q 20/065; G06Q 20/0658; G06Q 20/3674;
(Continued)

(56) References Cited

U.S. PATENT DOCUMENTS

| 5,778,069 A | * | 7/1998 | Thomlinson | .......... H04L 9/0662 |
| | | | | 708/250 |
| 9,614,868 B2 | * | 4/2017 | Yavuz | ................... H04L 9/3297 |

(Continued)

OTHER PUBLICATIONS

Andreas M. Antonopoulos, Mastering Bitcoin, Dec. 1, 2014, O'Reilly Media, 1st Edition, Chapters 5 & 8 (Year: 2014).*
(Continued)

*Primary Examiner* — John W Hayes
*Assistant Examiner* — Yingying Zhou
(74) *Attorney, Agent, or Firm* — Davis Wright Tremaine LLP

(57) ABSTRACT

The invention relates to distributed ledge technologies such as consensus-based blockchains. Computer-implemented methods for a secure random number generation within blockchain scripts are described. The invention is implemented using a blockchain network, which may be, for example, a Bitcoin blockchain. A third transaction is validated. The third transaction is associated with a third digital asset and includes a first and second puzzle in a locking script. The first puzzle is included, in a first transaction, in a first locking script that encumbers transfer of control of a first digital. The second puzzle is included, in a second transaction, in a second locking script that encumbers transfer of control of a second digital asset. A pseudorandom number is generated based at least in part on solutions to the first and second puzzles. Control of the third digital asset is transferred based at least in part on the pseudorandom number.

16 Claims, 12 Drawing Sheets

(51) Int. Cl.
| | |
|---|---|
| *G06Q 10/10* | (2023.01) |
| *G06Q 20/06* | (2012.01) |
| *G06Q 20/36* | (2012.01) |
| *G06Q 20/38* | (2012.01) |
| *H04L 9/00* | (2022.01) |
| *H04L 9/06* | (2006.01) |
| *H04L 9/32* | (2006.01) |

(52) U.S. Cl.
CPC ....... *G06Q 20/065* (2013.01); *G06Q 20/0658* (2013.01); *G06Q 20/3674* (2013.01); *G06Q 20/3827* (2013.01); *H04L 9/0637* (2013.01); *H04L 9/0643* (2013.01); *H04L 9/0662* (2013.01); *H04L 9/3247* (2013.01); *G06Q 2220/00* (2013.01); *H04L 9/50* (2022.05)

(58) Field of Classification Search
CPC ........... G06Q 20/3827; G06Q 2220/00; G06Q 20/223; G06F 16/2379; H04L 9/0637; H04L 9/0643; H04L 9/0662; H04L 9/3247; H04L 9/50; H04L 9/3236
See application file for complete search history.

(56) References Cited

U.S. PATENT DOCUMENTS

| | | |
|---|---|---|
| 2016/0292680 A1 | 10/2016 | Wilson, Jr. et al. |
| 2017/0023120 A1 | 1/2017 | Zulawski |
| 2017/0063535 A1* | 3/2017 | Brown ................. H04L 9/3066 |
| 2017/0084118 A1 | 3/2017 | Robinson et al. |
| 2017/0091750 A1* | 3/2017 | Maim ...................... H04L 9/14 |
| 2017/0236120 A1 | 8/2017 | Herlihy et al. |

OTHER PUBLICATIONS

Vitalik Buterin, Ethereum White Paper, 2014, ethereum.org (Year: 2014).*
Zeng et al., Pseudorandom Number Generators Based on Evolutionary Algorithm, 2003, IEEE, pp. 1662-1668 (Year: 2003).*
Blum et al., How to Generate Cryptographically Strong Sequences of Pseudo Random Bits, 1982, IEEE, pp. 112-117 (Year: 1982).*
Anonymous, "Script," Bitcoin Wiki, Jun. 8, 2017, 12 pages.
Antonopoulos et al., "Bitcoin Book," GitHub, retrieved from https://github.com/bitcoinbook/bitcoinbook, Jun. 8, 2017, 4 pages.
Antonopoulos, "Mastering Bitcoin—Unlocking Digital Cryptocurrencies," O'Reilly Media, Inc., Dec. 20, 2014, 282 pages.
Apodaca, "What OP code can I use in the scripting system to make a smart contract that acts similar to a lottery," Bitcoin Stack Exchange, Jul. 9, 2017 [retrieved Jan. 4, 2018], https://bitcoin.stackexchange.com/questions/56414/what-op-code-can-i-use-in-the-scripting-system-to-make-a-smart-contract-that-act, three pages.
BitLotto, "BitLotto—The Bitcoin Lottery / Raffle," retrieved from https://web.archive.org/web/20121113004141/http://www.bitlotto.com, 2012, 2 pages.
Bonneau et al., "Mixcoin—Anonymity for Bitcoin with Accountable Mixes," 18th International Conference on Financial Cryptography and Data Security, Nov. 2014, 25 pages.
Casascius, "Sustainable Nanopayment Idea: Probabilistic Payments," Bitcoin Forum, Feb. 2012 [retrieved Jan. 2, 2018], https://bitcointalk.org/index.php?topic=62558.0;wap, 5 pages.
Decker et al., "Bitcoin Transaction Malleability and MtGox," European Symposium on Research in Computer Security, Sep. 6, 2014, 13 pages.
DEEPCELERON, "Bitcoin Blockchain Raffle Ticket Picker," retrieved from https://we.lovebitco.in/raffle.html, 2013, 2 pages.
Deviate Fish, "Building a Lottery, Part 4: The trouble with public PRNGs," Mar. 17, 2017 [retrieved Jan. 4, 2018], https://medium.com/@deviatefish/building-a-lottery-part-4-e2bafaa968fa, six pages.
Hess, "How can I securely generate a random number in my smart contract?," Ethereum Stack Exchange, Jan. 21, 2016 [retrieved Jan. 4, 2018], https://ethereum.stackexchange.com/questions/191/how-can-i-securely-generate-a-random-number-in-my-smart-contract, five pages.
Hyena, "Anonymity in the Bitcoin: Splitting Transactions," retrieved from https://bitcointalk.org/index.php?topic=1394184.0, 2016, 9 pages.
International Search Report and Written Opinion mailed Nov. 30, 2018, Patent Application No. PCT/IB2018/056087, 10 pages.
International Search Report and Written Opinion mailed Nov. 30, 2018, Patent Application No. PCT/IB2018/056088, 10 pages.
Jeezy, "RNG using Block Informations," retrieved from https://bitcointalk.org/index.php?topic=289558.0, 2013, 9 pages.
Lomashuk et al., "Dao.Casino Whitepaper," latest edit Jun. 24, 2017 [retrieved Jan. 2, 2018], https://github.com/DaoCasino/Whitepaper/blob/master/DAO.Casino%20WP.md, 12 pages.
Nakamoto, "Bitcoin: A Peer-to-Peer Electronic Cash System," Bitcoin, Oct. 31, 2008, https://bitcoin.org/bitcoin.pdf, 9 pages.
Randao, "README.md at master," GitHub, Jul. 31, 2016 [retrieved Jan. 5, 2018], https://github.com/randao/randao/blob/master/README.md, 8 pages.
Satoshi et al., "Connection Limits," Bitcoin Forum, Aug. 9, 2010, https://bitcointalk.org/index.php?topic=741.0;prev_next=prev, 2 pages.*
UK Commercial Search Report mailed Jan. 12, 2018, Patent Application No. GB1713084.0, 7 pages.
UK Commercial Search Report mailed Jan. 12, 2018, Patent Application No. GB1713086.5, 9 pages.
UK IPO Search Report mailed Feb. 8, 2018, Patent Application No. GB1713084.0, 8 pages.
UK IPO Search Report mailed Feb. 16, 2018, Patent Application No. GB1713086.5, 4 pages.
Vnovak, "Ethereum Lottery—uses Bitcoin Blocks to Pick the Winner (via BTCRelay)" retrieved from https://www.reddit.com/r/ethereum/comments/4qql6d/ethereum_lotter, 2016, 3 pages.
Winsome, "Random Number Generation on Winsome.io—Future Blockhashes," retrieved from https://blog.winsome.io/random-number-generation-on-winsome-io-future-blockhashes-fe44b1c61d35, 2017, 12 pages.

* cited by examiner

RANDOM NUMBER GENERATION IN A BLOCKCHAIN

CROSS-REFERENCE TO RELATED APPLICATIONS

This application is a 371 of International Patent Application No. PCT/IB2018/056087, filed Aug. 13, 2018, entitled, "RANDOM NUMBER GENERATION IN A BLOCKCHAIN," which claims priority to United Kingdom Patent Application No. 1713086.5, filed Aug. 15, 2017, entitled "COMPUTER-IMPLEMENTED SYSTEM AND METHOD," and United Kingdom Patent Application No. 1713084.0, filed Aug. 15, 2017, entitled "COMPUTER-IMPLEMENTED SYSTEM AND METHOD," the disclosures of which are incorporated herein by reference in their entirety.

FIELD OF INVENTION

This invention relates generally to distributed ledger technologies, including blockchain transactions and, more particularly, to secure random number generation within blockchain scripts. This invention further utilises cryptographic and mathematical techniques to enforce security in relation to electronic transfers conducted over a blockchain network. The invention is particularly suited for but not limited to use in smart contracts.

BACKGROUND OF INVENTION

In this document the term "blockchain" may refer to any of several types of electronic, computer-based, distributed ledgers. These include consensus-based blockchain and transaction-chain technologies, permissioned and unpermissioned ledgers, shared ledgers and variations thereof. The most widely known application of blockchain technology is the Bitcoin ledger, although other blockchain implementations have been proposed and developed. While the example of "Bitcoin" may be referred to as a useful application of the technology described in in the present disclosure for the purpose of convenience and illustration, Bitcoin is just one of many applications to which the technology described in the present disclosure may be applied. However, it should be noted that the invention is not limited to use with the Bitcoin blockchain; alternative blockchain implementations and protocols, including non-commercial applications, also fall within the scope of the present invention. For example, techniques described within the present disclosure would provide advantages to utilising blockchain implementations that have limitations similar to Bitcoin regarding what constraints can be encoded within transactions, regardless whether an exchange of cryptocurrency occurs.

A blockchain is a peer-to-peer, electronic ledger that is implemented as a computer-based decentralised, distributed system made up of blocks, which, in turn, are made up of transactions and other information. In some examples, a "blockchain transaction" refers to an input message encoding a structured collection of field values comprising data and a set of conditions, where fulfilment of the set of conditions is prerequisite for the set of fields to be written to a blockchain data structure. For example, with Bitcoin each transaction is a data structure that encodes the transfer of control of a digital asset between participants in the blockchain system, and includes at least one input and at least one output.

In embodiments, a "digital asset" refers to binary data that is associated with a right to use. Examples of digital assets include Bitcoin and other cryptocurrencies. In some embodiments, such as with Bitcoin, the digital asset is untokenized so that, for instance, there is no identifier of the digital asset identified in the blockchain, but rather control of the digital asset is demonstrated through the ability to generate a valid transaction that becomes recorded on the blockchain. Note, however, that some blockchain implementations may use tokenized digital assets so that, for example, digital assets are specifically identifiable using information recorded on the blockchain. Although the digital asset may, in some embodiments, be used as cryptocurrency, it is contemplated that the digital asset, in embodiments, is additionally or alternatively usable in other contexts. Note that the invention, while applicable to the control of digital assets, is technical in nature and can be used in other contexts that utilise blockchain data structures without necessarily involving the transfer of digital assets. A "digital asset," as used in the present disclosure, may refer to one or more digital assets. For example, a transaction may have multiple inputs and each of those inputs may represent different digital assets. A digital asset whose control is transferred may be, in this example, a collection of multiple digital assets, the collection itself being a digital asset. Similarly, a transaction may subdivide and/or combine those multiple inputs to produce one or more outputs so that, for example, the number of inputs and the number of outputs may be different.

In some implementations, transferring control of a digital asset can be performed by reassociating at least a portion of a digital asset from a first entity to a second entity. Each block contains a hash of the previous block so that blocks become chained together to create a permanent, immutable record of all transactions that have been written to the blockchain since its inception. Transactions contain small programs known as scripts embedded into their inputs and outputs that specify how and by whom the outputs of the transactions can be accessed. On the Bitcoin platform, these scripts are written using a stack-based scripting language.

In some examples, "stack-based scripting language" refers to a programming language that supports various stack-based or stack-oriented execution models and operations. That is, the stack-based scripting language may utilize a data structure called a stack. With the stack, values can be pushed onto the top of the stack or popped from the top of the stack. Various operations performed to the stack can result in pushing or popping one or more of the values from the top of the stack. For example, an OP_EQUAL operation pops the top two items from the stack, compares them, and pushes a result (e.g., 1 if equal or 0 if unequal) to the top of the stack. In some scripting languages employed by some of the present embodiments, there may be at least two stacks: a main stack and an alternate stack. Some operations of the scripting language can move items from the top of one stack to the top of another stack. For example, OP_TOALTSTACK, moves a value from the top of the main stack to the top of the alternate stack. Scripts written in a stack-based scripting language may be pushed onto a logical stack that can be implemented using any suitable data structure such as a vector, list, or stack.

In order for a transaction to be written to the blockchain, it must be "validated". Network nodes (mining nodes) perform work to ensure that each transaction is valid, with invalid transactions rejected from the network. A node can have standards for validity different from other nodes. Because validity in the blockchain is consensus based, a transaction is considered valid if a majority of nodes agree that a transaction is valid. Software clients installed on the nodes perform this validation work on transactions referencing an unspent transaction output (UTXO) in part by executing the UTXO locking and unlocking scripts. If execution of the locking and unlocking scripts evaluates to TRUE and other validation conditions, if applicable, are met, the transaction is validated by the node. The validated transaction is propagated to other network nodes, whereupon a mining node can select to include the transaction in a blockchain. Thus, in order for a transaction to be written to the blockchain, it must be i) validated by the first node that receives the transaction—if the transaction is validated, the node relays it to the other nodes in the network; and ii) added to a new block built by a mining node; and iii) mined, i.e., added to the public ledger of past transactions. The transaction is considered to be confirmed when a sufficient number of blocks is added to the blockchain to make the transaction practically irreversible.

One area of current research is the use of the blockchain for the implementation of "smart contracts". These are computer programs designed to automate the execution of the terms of a machine-readable contract or agreement. Unlike a traditional contract, which would be written in natural language, a smart contract is a machine executable program that comprises rules that can process inputs in order to produce results, which can then cause actions to be performed dependent upon those results.

In some embodiments, although interaction with specific entities can be encoded at specific steps in the smart contract, the smart contract can otherwise be automatically executed and self-enforced. In some examples, automatic execution refers to successful execution of the smart contract that is performed to enable transfer of the UTXO. Note that, in such examples, an "entity" that is able to cause the transfer of the UTXO refers to an entity that is able to create the unlocking script without being required to prove knowledge of some secret. In other words, the unlocking transaction can be validated without verifying that the source of the data has access to a cryptographic secret (e.g., private asymmetric key, symmetric key, etc.). Also, in such examples, self-enforcement refers to the validation nodes of the blockchain network being caused to enforce the unlocking transaction according to the constraints. In some examples, "unlocking" a UTXO refers to creating a unlocking transaction that references the UTXO and executes as valid. Unlocking the UTXO may in the art also be known as spending the UTXO.

A blockchain transaction output includes a locking script and information regarding ownership of digital assets such as Bitcoins. The locking script, which may also be referred to as an encumbrance, "locks" the digital assets by specifying conditions that are required to be met in order to unlock the UTXO. For example, a locking script could require that certain data be provided in an unlocking script to unlock the associated digital assets. The locking script is also known as "scriptPubKey" in Bitcoin. A technique for requiring a party to provide data to unlock a digital asset involves embedding a hash of the data inside the locking script. However, this presents a problem if the data is undetermined (e.g., not known and fixed) at the time the locking script is created.

SUMMARY OF INVENTION

Thus, it is desirable to provide methods and systems that improve blockchain technology in one or more of these aspects. Thus, in accordance with the present invention, there is provided a method and corresponding system as defined in the appended claims.

Thus, it is desirable to provide, a computer-implemented method for a node of a blockchain network the computer-implemented method may comprising:
  validating a third transaction that includes, in a third locking script, a first puzzle and a second puzzle, wherein:
    the first puzzle is included, in a first transaction, in a first locking script that encumbers, with a first condition fulfillable by a solution to the first puzzle, transfer of control of a first digital asset;
    the second puzzle is included, in a second transaction, in a second locking script that encumbers, with a second condition fulfillable by a solution to the second puzzle, transfer of control of a second digital asset;
    the first transaction and the second transaction are committed to a blockchain; and
    the third transaction is associated with a third digital asset;
  generating, based at least in part on the solution to the first puzzle and the solution to the second puzzle, a pseudorandom number; and
  transferring control of the third digital asset based at least in part on the pseudorandom number.

The first transaction may be created by a first party, and the second transaction may be created by a second party different from the first party. In this manner, the seed derived from the solution to the first puzzle and the solution to the second puzzle may be indeterminable on the condition that at least one of the first party or the second party remain honest (e.g., do not attempt to subvert the pseudorandom number generator).

The first party may have access to the solution to the first puzzle prior to creation of the first transaction. Additionally or alternatively, the second party may have access to the solution to the second puzzle prior to creation of the second transaction. In this manner, the parties need not expend as much computational resources since they already know the solution to their respective puzzles.

The first locking script may include a time constraint. Additionally or alternatively, on a condition that the time constraint is fulfilled, validation of a transaction that includes the solution to the first puzzle may cause control of the first digital asset to transfer to a first entity. Additionally or alternatively, on a condition that the time constraint is unfulfilled, validation of a penalty transaction may cause the control of the first digital asset to transfer to a second entity different from the first entity.

The time constraint may be that the solution to the first puzzle is revealed before a time limit is exceeded. In this manner, the first entity has a reason to provide the solution to the first puzzle within the time constraint or else risk losing the digital asset to a second entity.

Validating the pseudorandom number generating transaction may be performed before fulfilment of the first condition and the second condition. Thus, the pseudorandom number generating transaction may be committed to the blockchain before the solutions are published, thereby ensuring that the pseudorandom number generating transaction is unable to be manipulated by an entity that knows the solutions to both the first puzzle and the second puzzle.

The first puzzle may be a cryptographic hash puzzle.

The first puzzle may be a set of operation codes in a locking script of the first transaction. Additionally or alternatively, execution of the set of operation codes may evaluate to true as a result of receiving the solution to the first puzzle as input.

Solving the first puzzle and the second puzzle may be more computationally difficult than verifying the solution to the first puzzle and the solution to the second puzzle.

Generating the pseudorandom number may include deriving a seed value based at least in part on the solution to the first puzzle and the solution to the second puzzle.

A seed transaction that includes the solution to the first puzzle and the solution to the second puzzle may be validated. In this manner, the seed may be indeterminable on the condition that at least one of the first party or the second party remains honest (e.g., do not attempt to subvert the pseudorandom number generator).

Transferring control of the third digital asset may include: On a condition that the pseudorandom number is a first value, validation of the seed transaction may be successful. Additionally or alternatively, on a condition that the pseudorandom number is a second value, different from the first value, validation of the seed transaction may be unsuccessful.

In this manner, the constraint imposed in the locking script of the pseudorandom number generator may be affected by the pseudorandom number.

A refund transaction to return control of the third digital asset to an entity that created the third transaction may be validated.

Validating the refund transaction may occur on a condition that successful validation of a seed transaction containing the solution to the first puzzle and the solution to the second puzzle does not occur within a certain period of time. In this manner the entity that created the third transaction need not suffer a loss of the digital asset in the event that the UTXO of the third transaction remains untransferred (e.g., after a certain amount of time).

It is also desirable to provide a system, comprising: a processor; and memory including executable instructions that, as a result of execution by the processor, causes the system to perform any of the methods as claimed.

It is also desirable to provide a non-transitory computer-readable storage medium having stored thereon executable instructions that, as a result of execution by one or more processors of a computer system, cause the computer system to at least perform any of the methods as claimed.

Thus, it is further desirable to provide, a computer-implemented method, comprising:
validating, at a node in a blockchain network, a first transaction that includes a puzzle, the first transaction being associated with a digital asset, a solution to the puzzle being indeterminable at a time of validation of the first transaction;
generating, at least in part by validating a second transaction created to transfer control of the digital asset associated with the first transaction, a pseudorandom number that based at least in part on a solution to the puzzle included in a second transaction; and
transferring control of the digital asset based at least in part on the pseudorandom number.

The puzzle may be a cryptographic hash puzzle.
The puzzle may be a proof of work function.
The puzzle may be a set of operation codes in a locking script of the first transaction. Additionally or alternatively, execution of the set of operation codes may evaluate to true as a result of receiving the solution to the puzzle as input.

Solving the puzzle may be more computationally difficult than verifying the solution.

Transferring control of the digital asset may include: On a condition that the pseudorandom number is a first value, validation of the second transaction may be successful. Additionally or alternatively, on a condition that the pseudorandom number is a second value, different from the first value, validation of the second transaction may be unsuccessful. In this manner, the constraint imposed in the locking script of the pseudorandom number generator may be affected by the pseudorandom number.

The solution may be used at least in part to derive a seed to a pseudorandom number generation algorithm in the locking script of the first transaction.

The locking script may constrain validation of the second transaction to a particular time frame. In this manner, parties may be provided with a reason to solve the puzzle within the particular time frame.

Expiration of the particular time frame may enable a specified party to receive the control of the digital asset.

The specified party may be a party that created the first transaction. In this manner, the specified party may be able to reclaim the digital asset in the event the puzzle is unsolved (e.g., after a particular time period).

A distribution (e.g., a reward) for solving the puzzle may be larger (e.g., greater in value) than the digital asset. In this manner, the greater distribution may provide a reason for parties to solve the puzzle; the greater the distribution in proportion to the digital asset, the greater the reason. In some cases, the size of the distribution may be limited so as to minimize the risk of parties attempting to cheat (e.g., subvert the pseudorandom number generating transaction and/or the solution).

The solution may be derived at least in part from a header of a block in the blockchain network.

The header may be indeterminable at a time that the first transaction is successfully validated. For example, the header may be a header of a future block on or after a particular time in the blockchain network. In this manner, because the future header will likely be indeterminable at the time the first transaction is created, it may provide assurance that the solution will be unknown until after the particular time.

It is also desirable to provide a system, comprising: a processor; and memory including executable instructions that, as a result of execution by the processor, causes the system to perform any of the methods as claimed.

It is also desirable to provide a non-transitory computer-readable storage medium having stored thereon executable instructions that, as a result of execution by one or more processors of a computer system, cause the computer system to at least perform any of the methods as claimed.

The invention can be described as a verification method/system, and/or as a control method/system for controlling the validation of blockchain transaction. In some embodiments, a validated blockchain transactions results in recordation of the transaction on a blockchain; this, in some applications, may result in an exchange or transfer of a digital asset via the blockchain. The digital asset is a unit of a resource managed by a blockchain. Although the digital asset may, in some embodiments, be used as cryptocurrency, it is contemplated that the digital asset, in embodiments, is additionally or alternatively usable in other contexts. Note that the invention, while applicable to the control of digital assets, is technical in nature and can be used in other contexts that utilise blockchain data structures without necessarily involving the transfer of digital assets. As explained below, the invention can also be described as a security method/system for new, improved and advantageous ways of performing operations via a blockchain network or platform.

BRIEF DESCRIPTION OF THE DRAWINGS

These and other aspects of the present invention will be apparent from and elucidated with reference to the embodiment described herein. An embodiment of the present invention will now be described, by way of example only and with reference to the accompanying drawings, in which.

DETAILED DESCRIPTION

Figure 1:
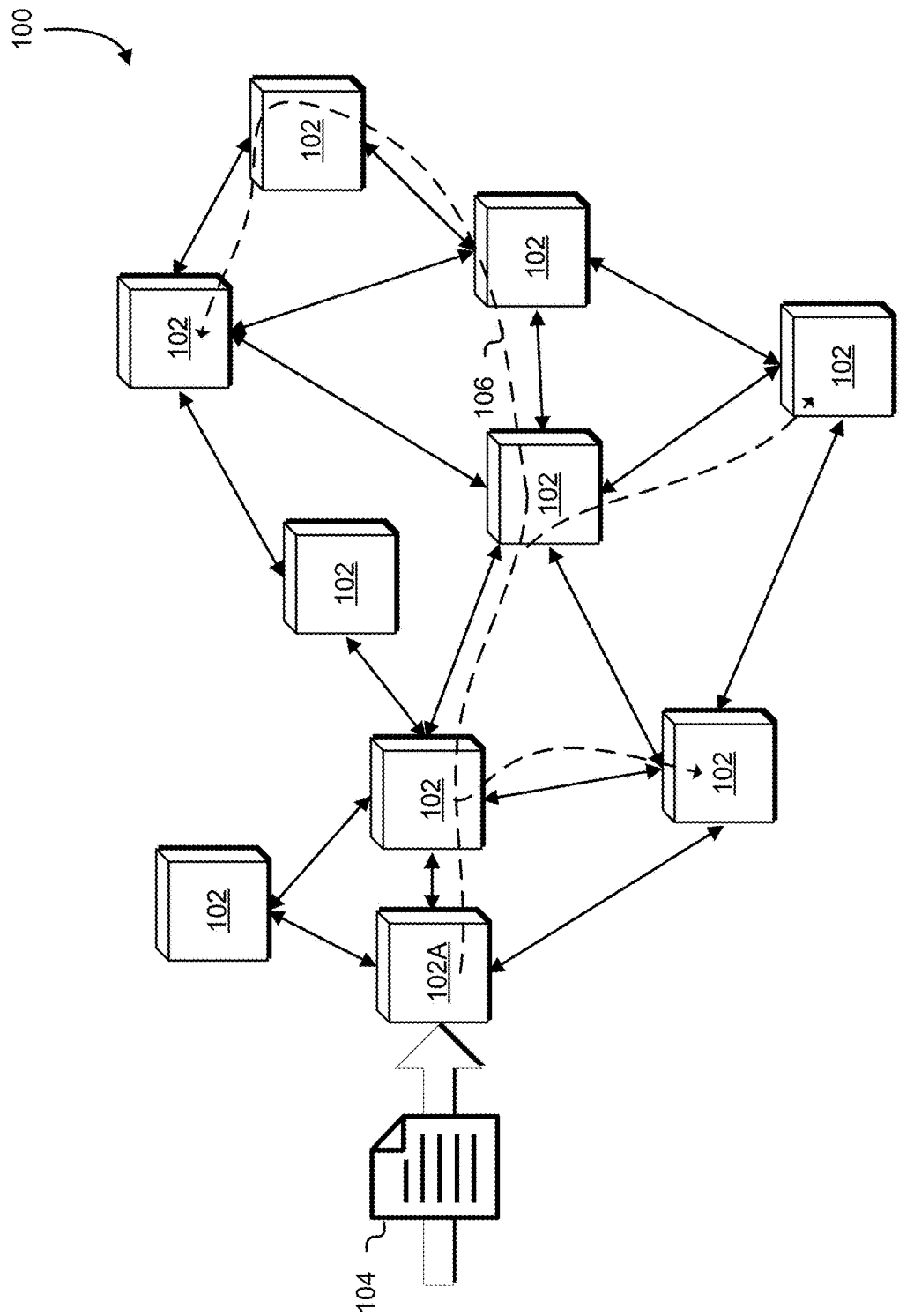
FIG. 1 illustrates a blockchain environment in which various embodiments can be implemented.

Reference will first be made to FIG. 1, which illustrates an example blockchain network 100 associated with a blockchain in accordance with an embodiment of the present disclosure. In the embodiment, the example blockchain network 100 comprises blockchain nodes that are implemented as peer-to-peer distributed electronic devices, each running an instance of software and/or hardware that performs operations that follow a blockchain protocol that is, at least in part, agreed to among operators of nodes 102. In some examples, "nodes" refers to peer-to-peer electronic devices that are distributed among the blockchain network. An example of a blockchain protocol is the Bitcoin protocol.

Figure 12:
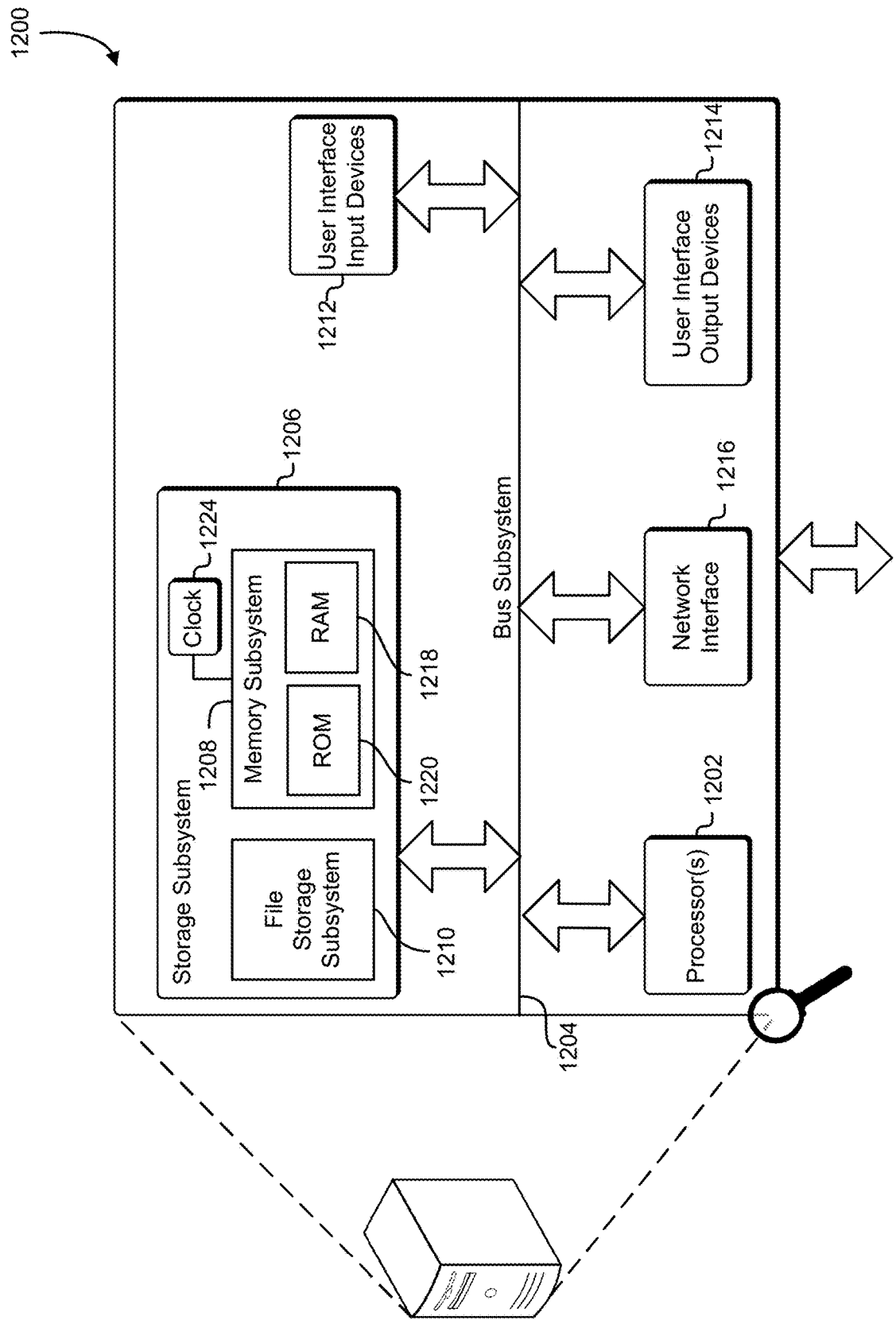
FIG. 12 illustrates a computing environment in which various embodiments can be implemented.

In some embodiments, the nodes 102 can be comprised of any suitable computing device (e.g., by a server in a data centre, by a client computing device (e.g., a desktop computer, laptop computer, tablet computer, smartphone, etc.), by multiple computing devices in a distributed system of a computing resource service provider, or by any suitable electronic client device such as the computing device 1200 of FIG. 12). In some embodiments, the nodes 102 have inputs to receive data messages or objects representative of proposed transactions, such as a transaction 104. The nodes, in some embodiments, are be queryable for information they maintain, such as for information of a state of the transaction 104.

As shown in FIG. 1, some of the nodes 102 are communicatively coupled to one or more other of the nodes 102. Such communicative coupling can include one or more of wired or wireless communication. In the embodiment, the nodes 102 each maintain at least a portion of a "ledger" of all transactions in the blockchain. In this manner, the ledger would be a distributed ledger. A transaction processed by a node that affects the ledger is verifiable by one or more of the other nodes such that the integrity of the ledger is maintained.

As for which nodes 102 can communicate with which other nodes, it can be sufficient that each of the nodes in the example blockchain network 100 are able to communicate with one or more other of the nodes 102 such that a message that is passed between nodes can propagate throughout the example blockchain network 100 (or some significant portion of it), assuming that the message is one that the blockchain protocol indicates should be forwarded. One such message might be the publication of a proposed transaction by one of the nodes 102, such as node 102A, which would then propagate along a path such as a path 106. Another such message might be the publication of a new block proposed for inclusion onto a blockchain.

In an embodiment, at least some of the nodes 102 are mining nodes that perform complex calculations, such as solving cryptographic problems. A mining node that solves the cryptographic problem creates a new block for the blockchain and broadcasts the new block to others of the nodes 102. The others of the nodes 102 verify the work of the mining node and, upon verification, accept the block into the blockchain (e.g., by adding it to the distributed ledger of the blockchain). In some examples, a block is a group of transactions, often marked with a timestamp and a "fingerprint" (e.g., a hash) of the previous block. In this manner, each block may become linked to a previous block, thereby creating the "chain" that links the blocks in the blockchain. In embodiments, valid blocks are added to the blockchain by a consensus of the nodes 102. Also in some examples, a blockchain comprises a list of validated blocks.

In an embodiment, at least some of the nodes 102 operate as validating nodes that validate transactions as described in the present disclosure. In some examples, a transaction includes data that provides proof of ownership of a digital asset (e.g., a number of Bitcoins) and conditions for accepting or transferring ownership/control of the digital asset. In some examples, a "unlocking transaction" refers to a blockchain transaction that reassociates (e.g., transferring ownership or control) at least a portion of a digital asset, indicated by an UTXO of a previous transaction, to an entity associated with a blockchain address. In some examples, a "previous transaction" refers to a blockchain transaction that contains the UTXO being referenced by the unlocking transaction. In some embodiments, the transaction includes a "locking script" that encumbers the transaction with conditions that must be fulfilled before ownership/control can be transferred ("unlocked").

In some embodiments, the blockchain address is a string of alphanumeric characters that is associated with an entity to which control of at least a portion of a digital asset is being transferred/reassociated. In some blockchain protocols implemented in some embodiments, there is a one-to-one correspondence between a public key associated with the entity and the blockchain address. In some embodiments, validation of transactions involves validating one or more conditions specified in a locking script and/or unlocking script. Upon successful validation of the transaction 104, the validation node adds the transaction 104 to the blockchain and distributes it to the nodes 102.

Certain embodiments of the present disclosure operate under the assumption that the scripting system or other system for implementing the sets of instructions described allow for more than 200 instructions (e.g., operation codes) in a single script. Likewise, certain embodiments of the present disclosure further assume that:

the functionality provided by the operation codes referred to in the present disclosure are present and enabled in the system that executes the operation codes scripts/sets of instructions; and/or That the required functionality can be can be implemented by the creation of customized functions that are written to provide the desired behaviour. These customized functions might be written to implement the functionality of operation codes that are present in the language but have been disabled, or may be "new" operation codes that provide specific functionality not natively provided for in the scripting language.

Examples of the operation codes referred to in the present disclosure include:

OP_ECPX, which returns the x-coordinate of the elliptic curve point

OP_ADD, which adds the top two items on the stack

OP_BIGMOD, which returns the remainder after dividing the top two items on the stack OP_BIGMODADD, which performs modulus addition of the top two items of the stack, modulus the third item of the stack OP_BIGMODINVERSE, which performs modulus negative exponent operation OP_BIGMODMUL, which performs modulus multiplication of the top two items of the stack modulus third item of the stack OP_CAT, which concatenates the top two items on the stack OP_CHECKSIG, in which a public key and signature are popped from the stack and verified against a signature of the transaction fields according to the SIGHASH type. If the signature is valid, 1 is returned, 0 otherwise.

OP_CHECKSIGVERIFY, which functions the same as OP_CHECKSIG, but OP_VERIFY is executed afterward OP_DERENCODE, which encodes the top two items on the stack in DER format OP_DUP, which duplicates the top stack item OP_ECPMULT, which performs elliptic curve point multiplication (also referred to as elliptic curve scalar multiplication) of the top two items on the stack OP_ELSE, which, if the preceding OP_IF or OP_NOTIF or OP_ELSE was not executed, then these statements are executed; otherwise, if the preceding OP_IF or OP_NOTIF or OP_ELSE was executed, then these statements are not executed OP_ENDIF, which ends an if/else block OP_EQUAL, which returns 1 if the inputs are exactly equal, 0 otherwise OP_EQUALVERIFY, which is the same as OP_EQUAL, but runs OP_VERIFY afterward OP_FROMALTSTACK, which puts the input onto the top of the main stack and removes it from the alternate stack OP_HASH256, in which the input is hashed twice: first with SHA-256 and then with RIPEMD-160

Figure 2:
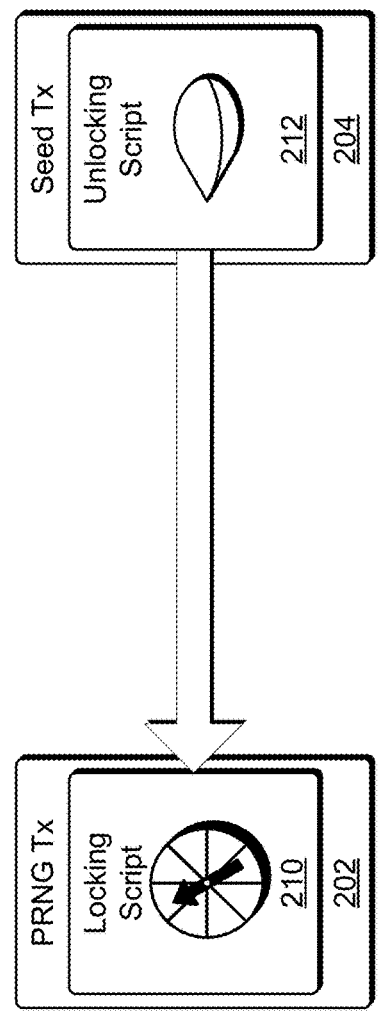
FIG. 2 illustrates an example of blockchain randomization in accordance with an embodiment.

OP_IF, which, if the top stack value is not False, the statements are executed and the top stack value is removed OP_MUL, which multiplies the top two items on the stack OP_NOTIF, which, if the top stack value is False, the statements are executed and the top stack value is removed OP_ROLL, in which the item that is n items deep in the stack is moved to the top OP_SUBSTR, which returns a section of a string OP_SWAP, in which the top two items on the stack are swapped OP_TOALTSTACK, which puts the input onto the top of the alternate stack and removes it from the main stack OP_VERIFY, which marks the transaction as invalid if the top stack value is not TRUE FIG. 2 is an example 200 illustrating an embodiment of the present disclosure. As illustrated in FIG. 2, the example includes a pseudorandom number generator (PRNG) transaction 202 with a locking script 210 that includes a PRNG that generates a random number based on a seed value received as a result of execution of an unlocking script 212 of a seed transaction 204 that attempts to unlock the UTXO of the PRNG transaction 202.

In some embodiments, the PRNG transaction 202 is a blockchain transaction that contains a PRNG within the locking script 210. In some embodiments, a PRNG, also known as a deterministic random bit generator (DRBG) refers to an algorithm that generates a sequence of numbers whose properties approximate the properties of sequences of random numbers. A PRNG is distinguished from a true random number generator because the sequence is dependent upon an initial seed value. In some embodiments, a PRNG with the same seed value will reproduce the same sequence. In some embodiments, the PRNG is coded within the locking script 210 as a sequence of operation codes that, as a result of execution, produces a statistically random (e.g., contains no recognizable patterns or regularities) value. The PRNG takes, as input, a value as a seed to initialize the PRNG.

In some embodiments, the locking script 210 is a script that encumbers the PRNG transaction 202 with conditions to be fulfilled (e.g., by data provided via the unlocking script 212) in order for validation of the PRNG transaction 202 to be successful, and control/ownership of a digital asset associated with the PRNG transaction 202 can be transferred. For example, the locking script 210 could require that certain data be provided in the unlocking script 212 in order to unlock the associated digital assets of the PRNG transaction 202. More particularly, execution of the locking script 210 by a validating node in a blockchain system, such as the blockchain network described in conjunction with FIG. 1, causes the locking script 210 to accept data from an executed unlocking script (e.g., the unlocking script 212), perform certain operations based on the data, and return a result that indicates whether the locking script 210 has been successfully "unlocked" (i.e., fulfilled the set of conditions set within the locking script 210). In the present disclosure, the locking script 210 further includes a PRNG as described above that includes as a condition that a seed be received as input (e.g., as a result of execution of the unlocking script 212 of the seed transaction 204) to the PRNG. In some embodiments, the locking script is coded to use the random number generated by the PRNG to use in the constraints of the locking script 210.

In some embodiments, the seed transaction 204 is a blockchain transaction that at least contains, within the unlocking script 212, a seed value usable by the PRNG in the locking script 210 of the PRNG transaction 202. In some embodiments, the unlocking script 212 is an executable script of the seed transaction 204 that attempts to satisfy the set of conditions placed on the locking script 210 of the PRNG transaction 202. A principle of operation of the present disclosure is that the seed value is not determinable at the time the locking script 210 is created, and, as a result, the value generated by the PRNG based on the seed value is likewise not determinable at the time the locking script 210 is created. The present disclosure describes embodiments that fulfil these conditions.

Figure 3:
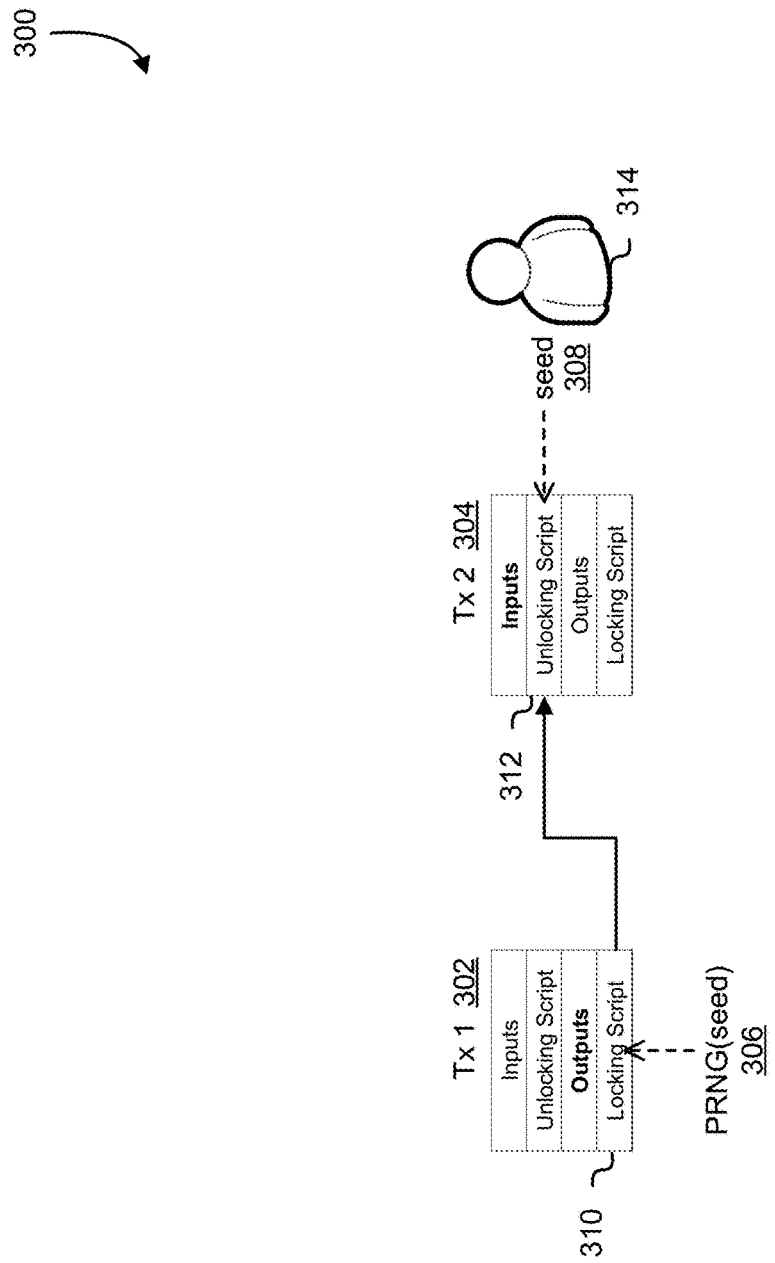
FIG. 3 illustrates an example illustrating a problem of insecure randomization that is solved by an embodiment.

FIG. 3 is an example 300 illustrating a problem of insecure randomness that is solved by an embodiment of the present disclosure. That is, in the example 200 illustrated in FIG. 2, a PRNG 306 is included in a locking script 310 of a first transaction 302, and a seed 308 for the PRNG 306 is provided through an unlocking script 312 of a second transaction 304 created to unlock/redeem a digital asset, such as a Bitcoin, associated with the first transaction 302.

In some embodiments, the first transaction 302 and the second transaction 304 are sets of field values that represent a transfer of a digital asset in a blockchain network. In some embodiments, the sets of field values can include inputs and outputs. Inputs, in some embodiments, represent an attempt to unlock an output of a previous blockchain transaction. Upon successful validation of a transaction, a validation node, in some embodiments, adds the transaction to the blockchain and causes it to be distributed to other nodes in the blockchain.

In some embodiments, the second transaction 304 is a blockchain transaction created to reassociate (e.g., transfer ownership or control) at least a portion of a digital asset (e.g., as indicated by an UTXO) of the first transaction 302, to a particular entity. In some embodiments, the first transaction 302 includes the locking script 310 that encumbers the first transaction 302 with conditions that must be fulfilled before ownership/control can be transferred ("unlocked"). In some embodiments, the blockchain address is a string of alphanumeric characters that is associated with an entity to which control of at least a portion of a digital asset is being transferred/reassociated. In some blockchain protocols implemented in some embodiments, there is a one-to-one correspondence between a public key associated with the entity and the blockchain address. In some embodiments, validation of transactions involves validating one or more conditions specified in the locking script 310 by executing the unlocking script 312 and the locking script 310 in succession.

As noted above, in some embodiments the PRNG 306 is a pseudorandom number generator that generates sequence of numbers whose properties approximates the properties of sequences of random numbers. In some examples, the PRNG 306 is a cryptographically secure pseudorandom number generator (CSPRNG), also referred to as a cryptographic pseudorandom number generator (CPRNG). In some embodiments, the PRNG 306 can be any pseudorandom number generator that can be encoded in a locking script under the assumptions described above including, but not limited to, the Yarrow, Fortuna, and arc4random algorithms.

In some embodiments, the locking script 310 is a script that encumbers a blockchain transaction by specifying conditions that are required to be met (i.e., "unlocked") in order to transfer control of at least a portion of a digital asset associated with the transaction. More particularly, executing the locking script 310 is configured to, as a result of execution by a validating node of a blockchain system, accept data from an executed unlocking script, such as the unlocking script 312, and perform certain operations based on the data and return a result that indicates whether execution of the unlocking script successfully "unlocked" (i.e., fulfilled the set of conditions set within) the locking script 310. In some embodiments, the locking script 310 defines one or more data constraints that must be satisfied (e.g., by data provided via the unlocking script) in order for validation of the transaction to be successful. For example, the locking script 310 could require that certain data be provided in the unlocking script 312 in order to unlock the associated digital asset associated with the first transaction 302.

In some embodiments, the seed 308 is a number or vector used to initialize a pseudorandom number generator, such as PRNG 306. However, because the seed 308 determines the pseudorandom numbers produced by the PRNG 306, as can be seen from FIG. 3, an entity 314 that supplies the seed 308 to the PRNG 306 can manipulate the output of the PRNG 306. However, the present disclosure presents two solutions as defences against seed manipulation. The first solution is the commitment solution whereby the seed is a combination of two or more puzzle solutions, with each puzzle solution being known to a separate party. However, before a PRNG transaction is created, each party commits a certain amount of a digital asset to a puzzle transaction, which can be recovered by revealing, in a solution transaction, the solution to the puzzle. In some embodiments of the commitment solution, failure to reveal the puzzle solution will cause the digital asset committed by the breaching party to be forfeited to the party or parties that do reveal their puzzle solutions. In some of these embodiments, each puzzle solution must be revealed within a certain time period or else the party will be considered in breach of its commitment. In this manner, each party may have a reason to contribute to the seed of the PRNG. With the commitment solution, each party generating a puzzle transaction is permitted to know the corresponding solution to the puzzle ahead of time. In the puzzle solution technique, the seed is a solution to a puzzle transaction. The solution is unknown at the time of the puzzle's creation, but a party that solves the puzzle can collect a distribution of a digital asset associated with the puzzle transaction.

In some examples, a "puzzle" refers to a set of logical expressions utilizing one or more operation codes in a scripting language that, if presented with a particular numerical "solution" as an input, evaluates to TRUE as a result of execution. Puzzles can have a variety of levels of difficulty, which can affect the time necessary to solve the puzzle. Puzzles can also have the characteristic that arriving at the solution (i.e., solving the puzzle) is more computationally difficult than verifying that the solution is correct. An example of a puzzle is a cryptographic hash puzzle wherein the puzzle is to find a number that, if combined (e.g., added, multiplied, appended, etc.) with a specified number and then processed through a given cryptographic hash algorithm (e.g., SHA256, MD5, BLAKE, BLAKE2, etc.), yields a value containing specific digits (e.g., five leading zeros, "1234", etc.). In some examples, a cryptographic hash puzzle is a problem that is created or solved using a cryptographic hash algorithm such as, for example, a problem defined by a function that includes at least one cryptographic hash algorithm and a set of conditions, and a solution to the puzzle is a set of inputs to the function that results in output that satisfies the set of conditions.

Note that, in embodiments, a hash is generated with a cryptographic hash function or one-way function $h(x)=y$ where y is easy to calculate for a given x, but x is computationally difficult to calculate for a given y. In some cases, the solution may be a digital signature of the party or other data that, if provided as input via an unlocking script to the locking script holding the puzzle, causes the locking script to evaluate to TRUE as a result of execution of the unlocking script and locking script.

In some examples, computational difficulty refers to a complexity class in accordance within the field of computational complexity theory. For example, digitally signing a message using a Merkle signature scheme could involve, as part of generating a correct solution, performing 2r cryptographic hash operations where r is the depth of the generated Merkle tree. Conversely, verifying that a signing key used to generate a digital signature is a leaf node of a Merkle tree could involve performing r cryptographic hash operations to verify an authentication from a leaf node (corresponding to a signing key) to the root node. As can be seen, performing 2r cryptographic hash operations would be more computationally difficult (e.g., expends more central processing unit cycles, uses more memory/storage space, etc.) than performing r cryptographic hash operations. As a second example, a system could generate a two prime numbers and provide the product of the primes as a puzzle, the solution to which would be to factor the provided product.

It should be noted that the phrase "one-way function" includes functions that are not necessarily one-way in the strict mathematical sense but that exhibit properties (such as collision resistance, preimage resistance and second preimage resistance) that render the function useful in contexts in which the various techniques of the present disclosure are applied. In this manner, an entity with output of the function but without access to the corresponding input may be unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash-based message authentication code (HMAC)), key derivation functions, such as PBKDF2 and bcrypt (with the password being based at least in part on the plaintext and the cryptographic key, e.g.) and other secure randomization functions which may but do not necessarily have a domain (set of possible inputs) that is larger than their range (possible outputs). A value can be cryptographically derived using a one-way function. An encryption function can be (or can be a component of) a one-way function from the perspective of an entity that lacks information (e.g., a cryptographic key and/or a salt) used as input into the encryption function. In some examples, "cryptographically derived" refers to using a one-way function at least once, using inputs that are the values or derived from the values (possibly cryptographically derived from the values). For example, an encryption operation is "one-way" to entities that do not have the decryption key.

Figure 4:
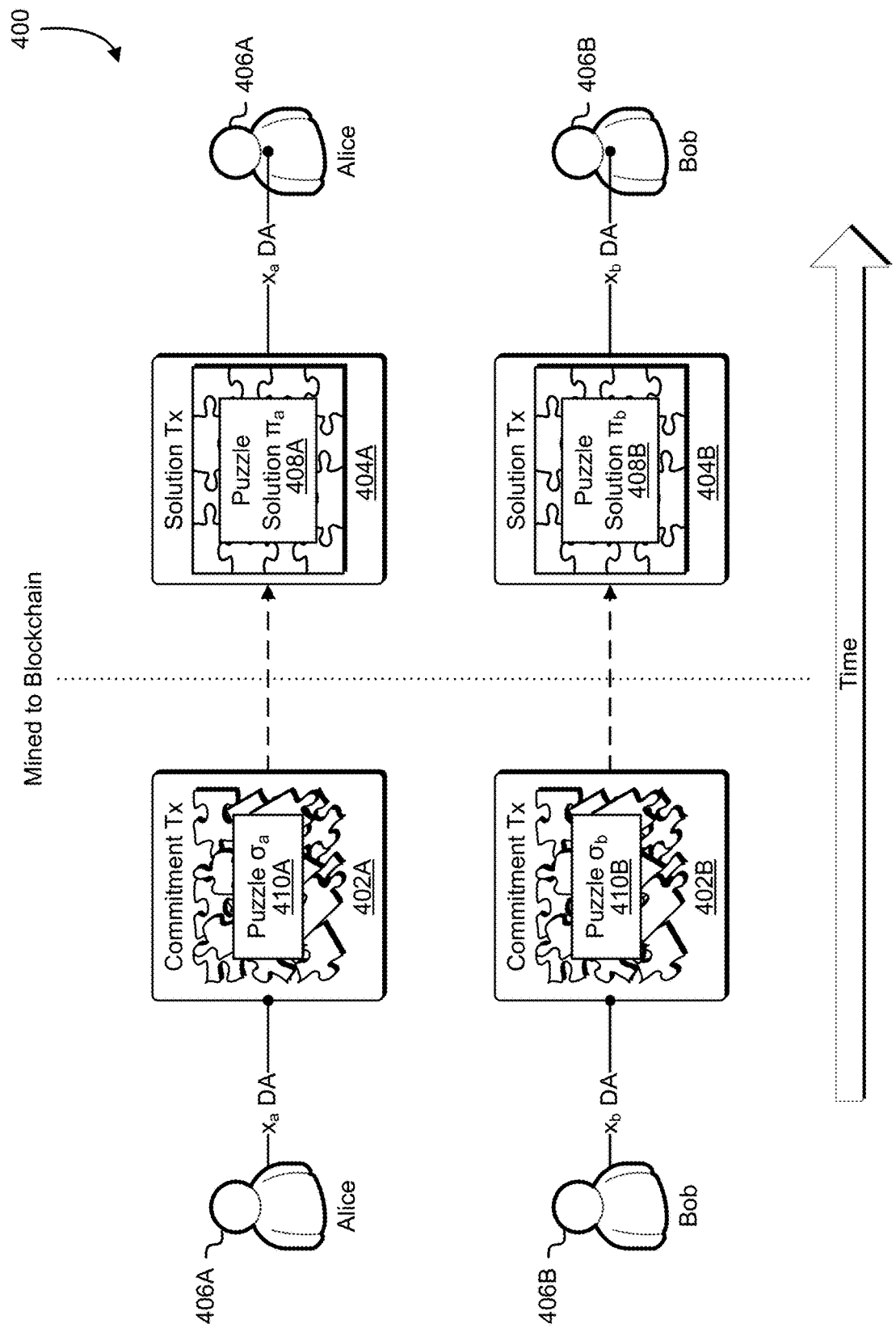
FIG. 4 illustrates an example of a commitment solution for generating portions of a seed in accordance with an embodiment.

FIG. 4 illustrates an example embodiment 400 of the present disclosure. Specifically, FIG. 4 depicts a first stage in the commitment solution for seed generation. The commitment solution depicted in the example embodiment 400 involves at least two parties 406A-06B to contribute solutions 408A-08B that can be combined to derive a seed for a PRNG. An advantage provided by the commitment solution is that, because the solutions 408A-08B are combined, it would take agreement from all parties to manipulate the seed; that is, so long as one party provides a solution that is not known ahead of time by the other parties, the resulting seed will be unknown until it is generated.

In the commitment solution, the parties 406A-06B ($p \in \{0, 1, \ldots, n\}$) each create separate commitment transactions 402A-02B with puzzles 410A-10B included as constraints in the transactions' respective locking scripts. In some embodiments, each commitment transaction is associated with some amount of a digital asset (e.g., $x_p$) encumbered by a locking script containing a constraint ($\sigma_p \leftarrow \text{Verify}(\text{puzzle}_p, \pi_p)$, where $\pi_p$ is the proposed solution to the puzzle of party p. In some embodiments, the constraint is also time-limited, meaning that the party must reveal the solution within a specific time period or risk forfeiture of the committed digital asset. In some embodiments, the digital asset is committed from the party's own reserves. In other embodiments, the digital asset is provided as a potential distribution by a third party, such as the party seeking to generate a random number from the seed determined by the parties 406A-06B. In some embodiments, the parties 406A-06B are provided with a reason to participate in the creation of the seed by the promise of a distribution from the creator of a PRNG transaction, such as the PRNG transaction 610 of FIG. 6, or from some other entity having an interest in creating seeds for pseudorandom number generation.

After the commitment transactions 402A-02B are mined to the blockchain, each (p) of the parties 406A-06B can unlock the UTXO of their respective commitment transaction by revealing the solution to the commitment transaction puzzle ($\pi_p \leftarrow \text{puzzle solution}_p$) via creation of a solution transaction with an unlocking script that unlocks the locking script of the corresponding commitment transaction. As can be seen in the example embodiment 400, the solution transactions 404A-04B include solutions 408A-08B to their corresponding puzzles 410A-10B. Validation of the solution transaction 404A-04B therefore allows the parties 406A-06B to recover the UTXO of the respective commitment transactions 402A-02B.

In some embodiments, the commitment transactions 402A-02B are blockchain transactions, similar to the first transaction 302 of FIG. 3 that have digital assets committed by the respective parties 406A-06B. In some embodiments, the solution transactions 404A-04B are blockchain transactions, similar to the second transaction 304 of FIG. 3, created by the parties 406A-06B to "unlock" the UTXO of the respective commitment transactions in order to redeem the committed digital assets.

Figure 6:
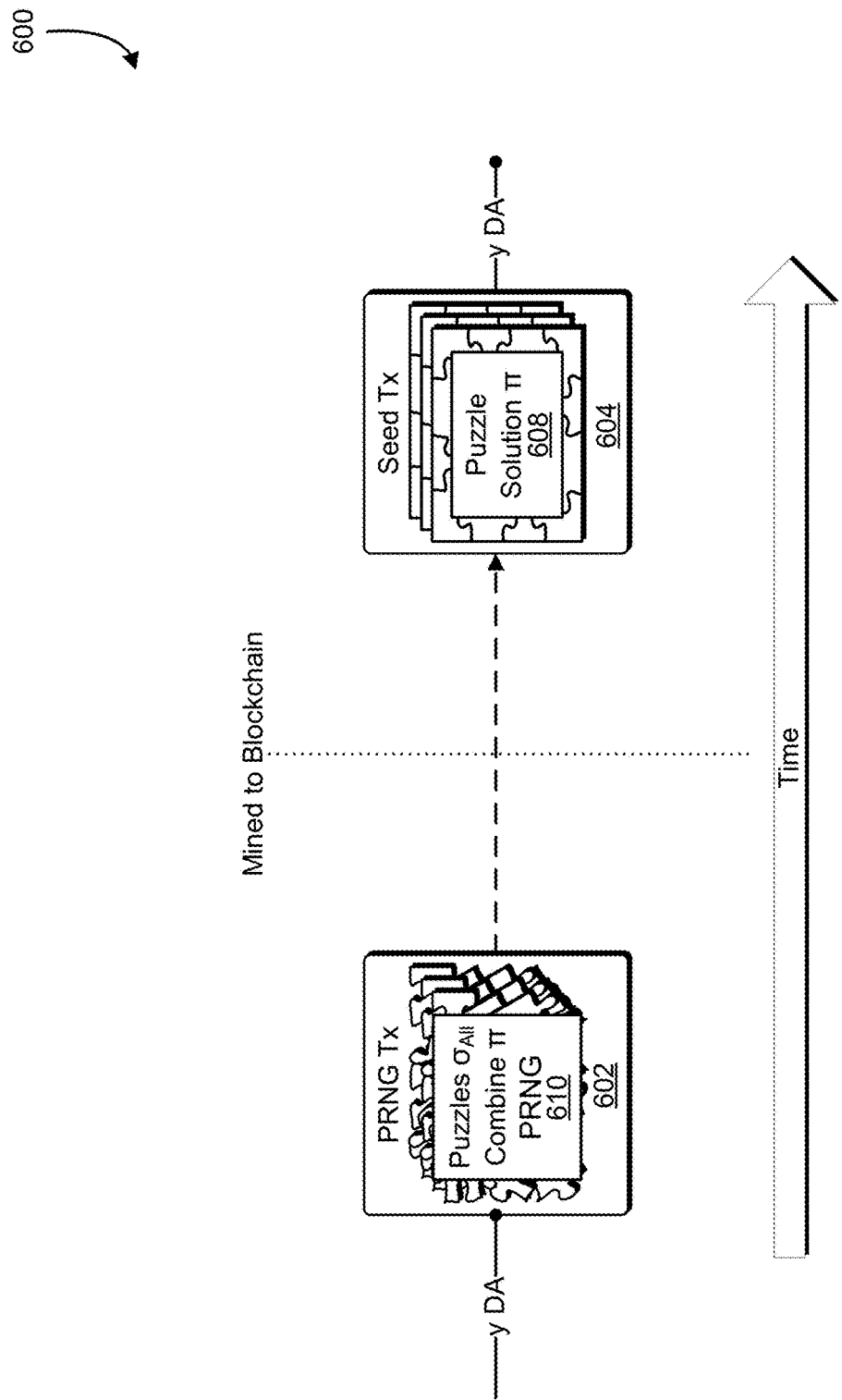
FIG. 6 illustrates an example of implementing a seed transaction to unlock a pseudorandom number generating transaction in accordance with an embodiment.

In some embodiments, the parties 406A-06B are entities that have agreed to provide the puzzles 410A-10B and solutions 408A-08B used in seed generation for a PRNG, such as the PRNG in the time-limited constraint 610 of FIG. 6. The puzzles 410A-10B need not be complex. For example, the party 406 could know the result of a cryptographic hash of the letter "A" and could create the puzzle 410A to cryptographically hash an input and compare the cryptographically hashed input to the known cryptographic hash of the letter "A." If the hashed input matches the known hash result, then the input is a correct solution to the puzzle 410A. In this case, the solution is the letter "A," which the first party 406A is aware of and can enter into the unlocking script of the solution transaction 404A as the first solution 408A. However, other parties examining the cryptographic hash in the locking script are unlikely to directly recognize that the solution is the letter "A." Although only two parties are depicted in the example 400, it is contemplated that any number of parties can participate in providing puzzles and solutions as long as there are at least two parties.

In some embodiments, the solutions 408A-08B (similar to the solution 608 of FIG. 6) are values that can be combined to derive a seed to a PRNG, such as the PRNG in the time-limited constraint 610. Individually, each of the solutions 408A-08B are values that if provided as input via unlocking scripts of the solution transactions 404A-04B to the locking scripts of the commitment transactions 402A-02B containing the puzzles 410A-10B, cause execution of the respective unlocking and unlocking scripts to evaluate to TRUE. Providing the seed to the PRNG causes execution of the PRNG to generate a random number, which can be used in various ways in smart contracts, some examples of which are shown in tables 2 and 3 below. In some embodiments, at least one of the parties 406A-06B knows or otherwise has access to the solution to their respective puzzle at the time the associated commitment transaction is created. In other embodiments, all of the parties 406A-06B know or otherwise have access to the solutions to their respective puzzles 410A-10B at the time their associated commitment transaction 402A-02B are created.

Figure 7:
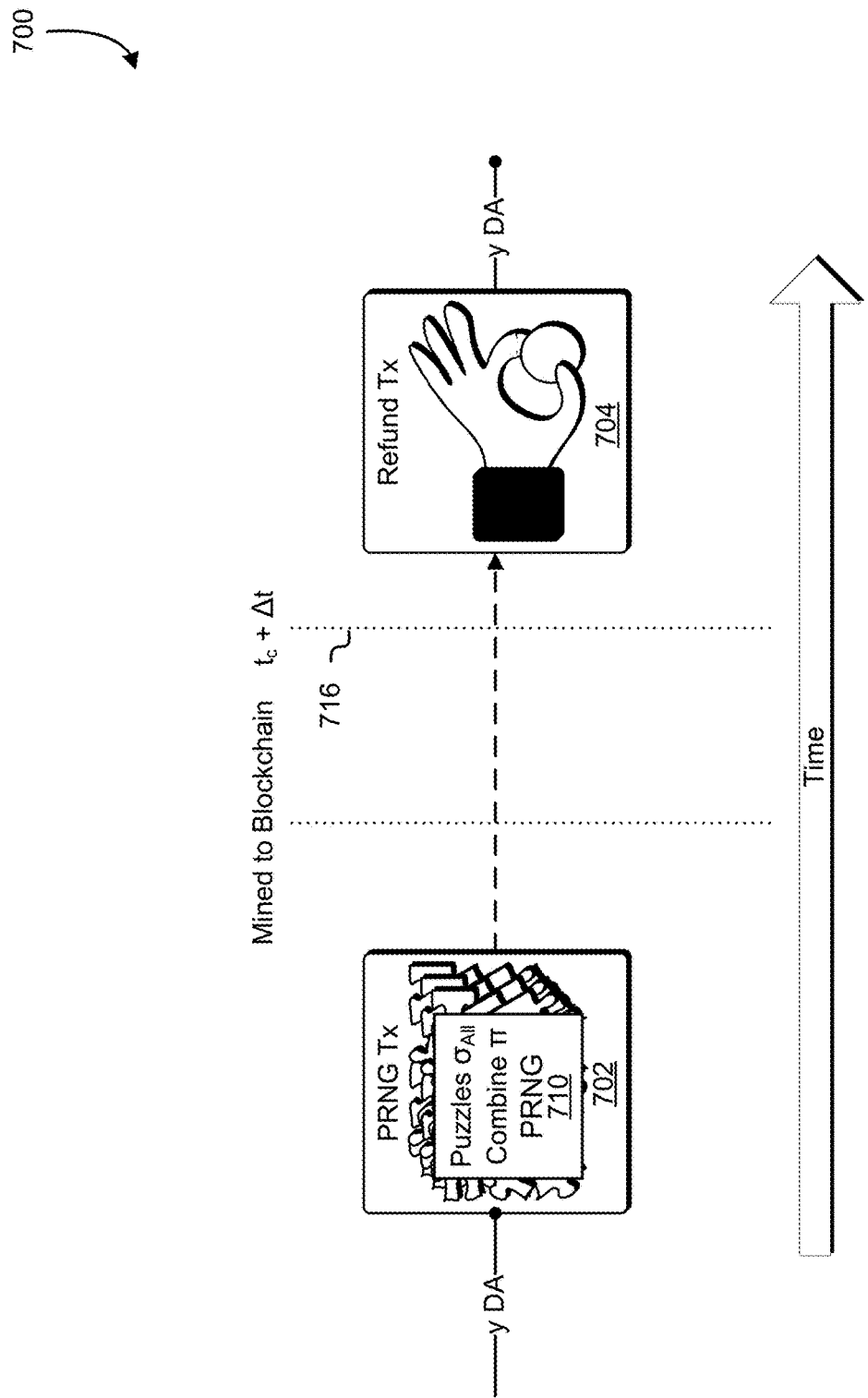
FIG. 7 illustrates an example of refunding a digital asset as a result of time limit expiration in accordance with an embodiment.

The parties 406A-06B may be prompted to reveal their respective puzzle solutions 408A-08B by the difference between the committed values (e.g., $x_p$) and a PRNG transaction value (e.g., y in FIGS. 6 and 7. For example, if $x_p \gg y$, the parties 406A-06B will have a strong reason to reveal their solutions 408A-08B because they risk losing much more than a potential gain caused by forcing a refund transaction, such as the refund transaction 704 of FIG. 7.

In some embodiments, the puzzles 410A-10B are algorithms comprising a sequence of operations, such as a sequence of operation codes of a scripting language performed on one or more inputs, that returns an indication of TRUE or FALSE. For example, if the solution 404A is a valid solution for the puzzle 410A, execution of the puzzle 410 in the locking script of the commitment transaction 402A could evaluate to TRUE (assuming any other constraints present within the commitment transaction 402A are also met as well). However, if a proposed solution to the puzzle 410A is an invalid solution, execution of the puzzle 410A in the locking script of the commitment transaction 402A evaluates to FALSE.

Figure 5:
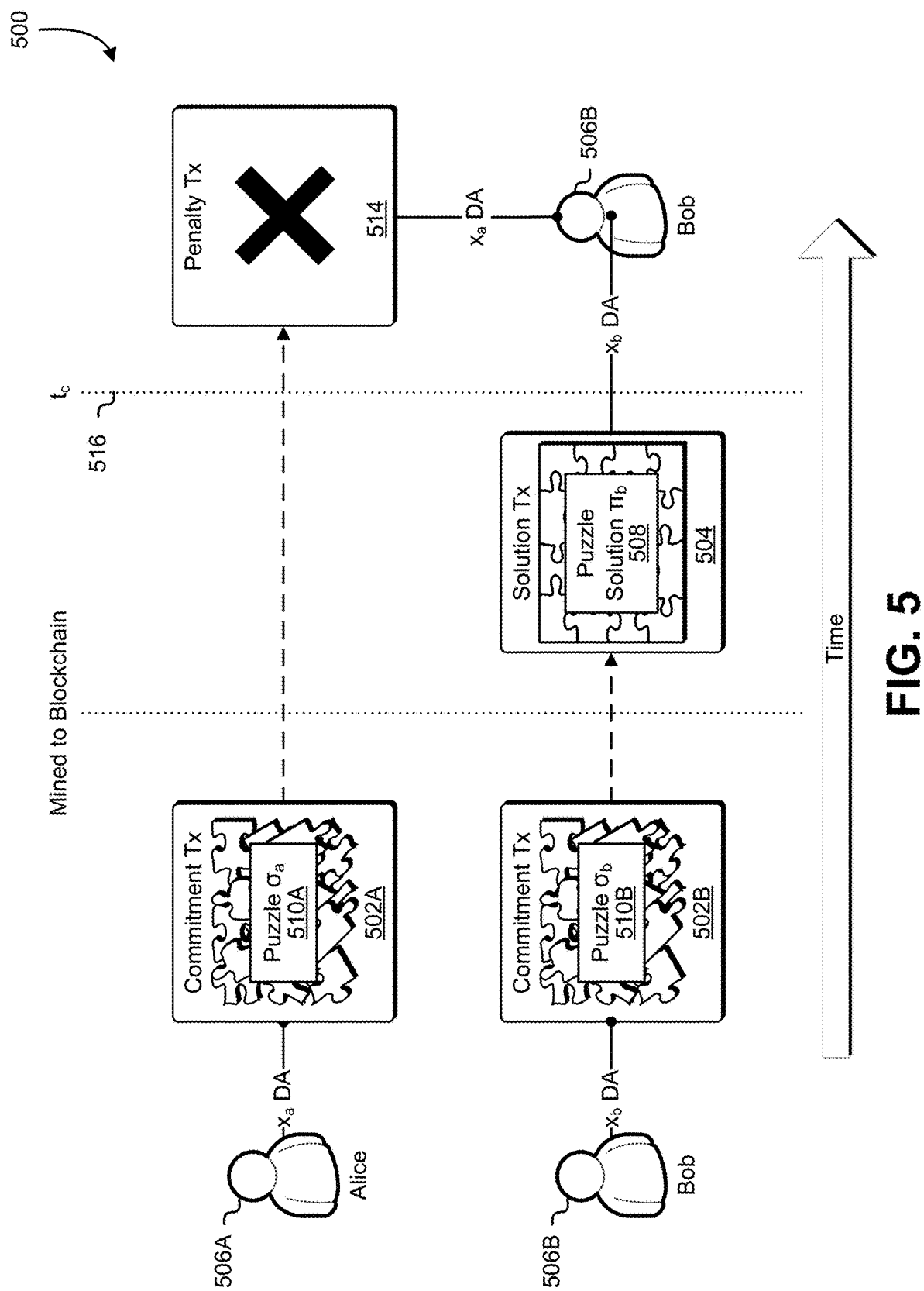
FIG. 5 illustrates an example of a commitment solution penalty in accordance with an embodiment.

FIG. 5 illustrates an example 500 of a consequence of failing to provide a valid solution to a commitment transaction within a particular time frame. Specifically, FIG. 5 depicts a situation where a first party 506A has failed to provide a solution to the puzzle 510A ($\sigma_a$) in the first commitment transaction 502A before expiration of a time limit 516 ($t_c$). On the other hand, a second party 506B did provide a solution 508 ($\pi_b$) for its corresponding puzzle 510B ($\sigma_b$) in the commitment transaction 502B created by the second party 502B within the time limit 516. As a consequence, the second party 506B is able to claim ownership of the digital asset ($x_a$) committed by the first party as a result of validation of a penalty transaction 514.

In some embodiments, the commitment transactions 502A-02B are similar to the commitment transactions 402A-02B of FIG. 4. Likewise, in some embodiments the puzzles 510A-10B are similar to the puzzles 410A-10B. In some embodiments, the solution transaction 504 is similar to the solution transaction 404B of FIG. 4. Likewise, in some embodiments, the solution 508 is similar to the solution 408B of FIG. 4. In some embodiments, the parties 506A-06B are entities similar to the parties 406A-06B of FIG. 4.

In some embodiments, the penalty transaction 514 is a blockchain transaction that can be validated to unlock the UTXO of the commitment transaction 502A on the condition that the UTXO of the commitment transaction 502A remains untransferred after the time limit 516. Because the first party 506A has committed some portion of a digital asset to the commitment transaction 506A, the penalty transaction 514 exists to deter the first party 506A from failing to reveal the solution to the puzzle 510A, since if the first party 506A fails to reveal their solution, one or more other parties who have made commitment transactions, such as the second party 506B, can claim whatever digital asset the first party 506A has committed to the first commitment transaction 502A. In this manner, the parties 506A-06B may both be committed to revealing the solutions to their respective puzzles 510A-10B or else the parties 506A-06B risk losing their committed digital assets. Furthermore, the parties 506A-06B are provided with further reason to reveal the solutions to their respective puzzles 510A-10B due to the chance that another of the parties fails to reveal their solution, thereby allowing the non-breaching party to not only reclaim their own committed digital asset but also be awarded at least a portion of the breaching party's committed digital asset. This is the case shown in the example 500 where the second party 506B profits from revealing the solution 508 and receives a distribution from the penalty transaction 514.

In some embodiments, the time limit 516 is a deadline enforced in the locking script of the commitment transaction 502A. That is, in some embodiments the locking scripts of the commitment transactions 502A-02B are configured to restrict the entities that are allowed to unlock the UTXO of commitment transactions 502A-02B to only the creator of the respective commitment transaction up to expiration of the time limit 516 coded into the locking script. In some embodiments, the locking script, however, can be configured to, after expiration of the time limit 516, allow one or more other parties, such as the second party 506B, to claim the UTXO of the commitment transaction and disallow the creator of the commitment transaction 502A from claiming the UTXO of the commitment transaction 502A. In some embodiments, the commitment transactions 502A-02B must include the time limit 516 in their locking scripts in order to be validated. In this manner, the penalty transaction 514 may operate as a penalty to provide the parties 506A-06B with a reason to provide timely solutions to their puzzles 510A-10B.

FIG. 6 illustrates another example embodiment 600 of the present disclosure. Specifically, FIG. 6 depicts a second stage in the commitment solution for seed generation that may occur in parallel with the example embodiment 400 of FIG. 4. That is, after the commitment transactions 402A-02B have been mined to the blockchain, the PRNG transaction 602 is created by an entity that seeks to impose a randomized constraint on the transfer of control of digital asset y. Thus, the locking script of the PRNG transaction 602 is encumbered with a locking script containing a PRNG and a time-limited constraint 610 $\sigma_{All} \leftarrow \Lambda \sigma_p$ and code to combine puzzle solutions $\{\pi_a, \ldots, \pi_n\}$ in an unlocking script of the seed transaction 604 into a solution $\pi$ from which a seed for the PRNG in the locking script (e.g., $\pi \leftarrow$ Combine $(\{\pi_a, \ldots, \pi_n\})$ can be derived. That is, in some cases the solution $\pi$ itself may be used as the seed, whereas in other cases the solution $\pi$ may be hashed or otherwise manipulated into a value usable by the PRNG as a seed. The time-limited constraint 610 can be constrained in a variety of ways. For example, there could be one or more operation codes in the locking script of the PRNG transaction 602 that, upon execution, checks a current time against a specified expiration time.

In the example embodiment 600, the seed transaction 604 is a blockchain transaction created to unlock the UTXO of the PRNG transaction 602. In some embodiments, in order to discourage manipulation of the PRNG, the PRNG transaction 602 is created after the commitment transactions (e.g., the commitment transactions 402A-02B of FIG. 4) are committed to the blockchain but prior to creation of the solution transactions (e.g., the solution transactions 404A-04B). In some embodiments, the seed transaction 604 is created after the solutions to all of the puzzles, such as the solutions 408A-08B, have been committed to the blockchain or otherwise made available to the creator of the seed transaction 604. In some embodiments, the seed transaction 604 includes in its unlocking script the solutions 608 ($\pi$) to the various puzzles, such as the solutions 408A-08B to the puzzles 410A-10B of FIG. 4.

In some embodiments, each solution in the solutions 608 is listed separately and combined by execution of the locking script of the PRNG transaction 602. In other embodiments, each of the solutions 608 is combined together in the unlocking script of the seed transaction 604 in a manner supported by the locking script of the PRNG transaction 602. The locking script of the PRNG transaction 602 can evaluate to TRUE if all of the solutions 408A-08B are provided in the unlocking script of the seed transaction 604. Alternatively, in some embodiments, if the solutions 408A-08B are not provided before expiration of a time limit, the digital asset y is refunded, as depicted in FIG. 7.

In one example, an entity engages a group of parties to create commitment transactions similar to the commitment transactions 402A-02B of FIG. 4. The entity then creates the PRNG transaction 602 using the puzzles 410A-10B combined into the time-limited constraint 610. That is, in a simplified two-party example to the example embodiment 400 of FIG. 4, if the first party 406A reveals the first solution 608A prior to creation of the PRNG transaction 602, then the second party 406B, already having knowledge of the second solution 408B and now having knowledge of the first solution 408A, could potentially determine the outcome of the PRNG in the locking script of the PRNG transaction 602. Thus, in order to safeguard the unpredictability of the PRNG result, the solutions 408A-08B should not be revealed prior to creation of the PRNG transaction 602.

In some embodiments, the entity can further create penalty transactions for each of the commitment transactions 402A-02B, similar to the penalty transaction 514 of FIG. 5. Furthermore, in some embodiments, the entity can additionally or alternatively create a refund transaction, similar to the refund transaction 704 of FIG. 7, to ensure the entity does not forfeit the digital asset y in the event one or more of the solutions 408A-08B are not provided.

FIG. 7 illustrates an example 700 of another consequence of a party's failing to provide a valid solution to a commitment transaction within a particular time frame. Specifically, FIG. 7 depicts a situation where a party has failed to provide a solution to one of the puzzles in $\sigma_{All}$, such as in the situation depicted in FIG. 5. As a result, after time 716 $t_c+\Delta t$ the digital asset y associated with the PRNG transaction 702 can be redeemed with a refund transaction 704.

In some embodiments, the PRNG transaction 702 is similar to the PRNG transaction 602 of FIG. 6. As shown the example 700, in some embodiments the PRNG transaction 702 is coded to expire at some time ($\Delta t$) after expiration ($t_c$) of the commitment transaction in order to discourage a party from waiting to reveal their solution until the PRNG transaction 702 is about to expire because doing so could impair the ability to create a seed transaction, such as the seed transaction 604, in time to unlock the UTXO of the PRNG transaction 702.

In some embodiments, the refund transaction 704 is a blockchain transaction created to reimburse/reclaim the digital asset y associated with the PRNG transaction 702 in the event that the digital asset y remains unclaimed, such as by validation of a seed transaction containing a solution to the puzzle 710, after the time 716 t+$\Delta$t. In examples, the refund transaction 704 is created by the creator of the PRNG transaction 702 to ensure that if no solution to the puzzle 710 is found, the creator is able to get the digital asset y back. In some examples, however, the creator of the PRNG transaction 702 and the creator of the refund transaction 704 need not be the same party. In some embodiments, the time 716 is a time limit set on the amount of time allowed to provide a solution to seed the PRNG transaction 702.

Figure 8:
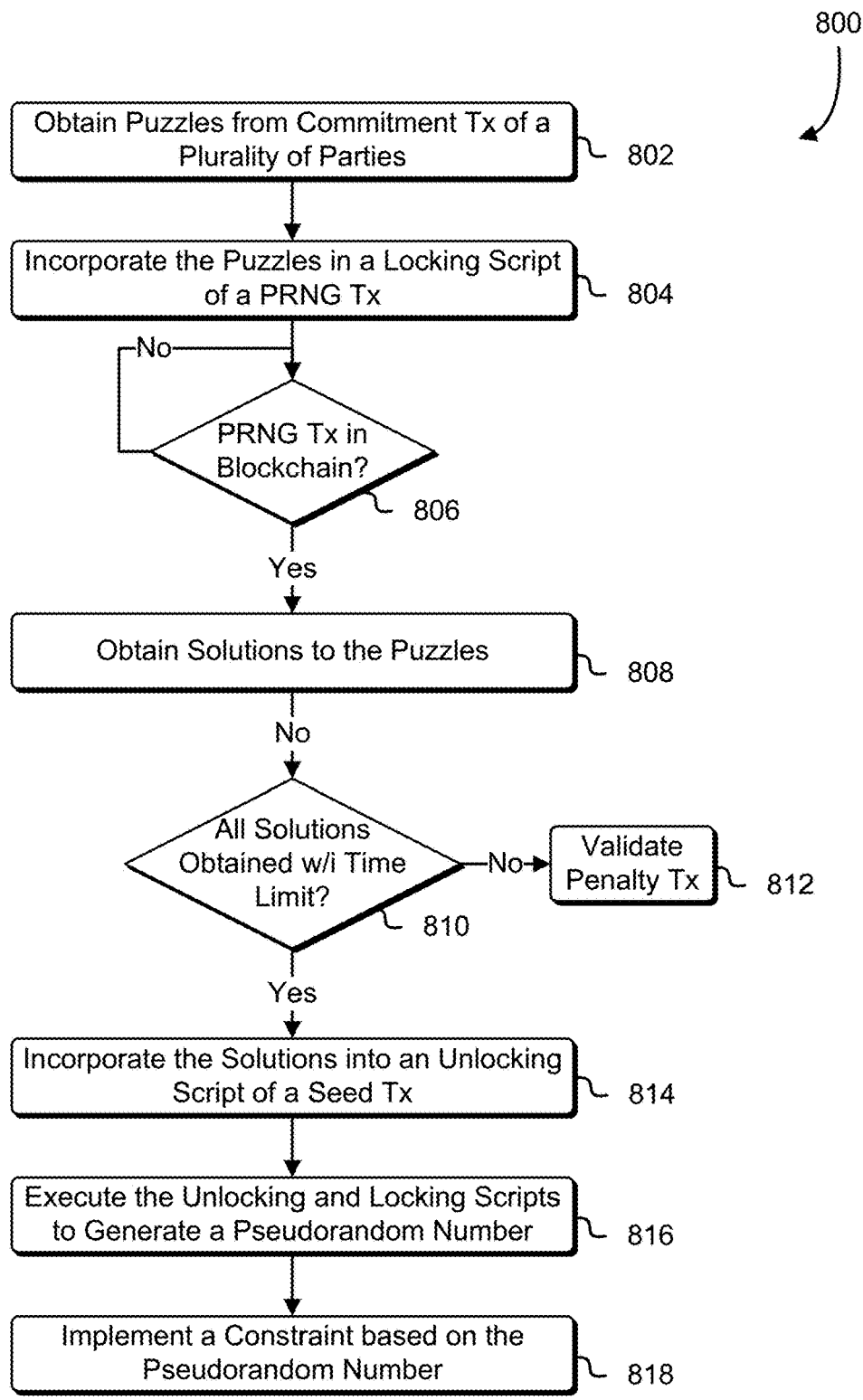
FIG. 8 is a flowchart that illustrates an example of a commitment solution in accordance with an embodiment.

FIG. 8 is a flowchart illustrating an example of a process 800 for generating a random number in accordance with various embodiments of the commitment solution of the present disclosure. Some or all of the process 800 (or any other processes described, or variations and/or combinations of those processes) can be performed under the control of one or more computer systems configured with executable instructions and/or other data, and can be implemented as executable instructions executing collectively on one or more processors. The executable instructions and/or other data can be stored on a non-transitory computer-readable storage medium (e.g., a computer program persistently stored on magnetic, optical, or flash media).

For example, some or all of process 800 can be performed by one or more of computing devices (e.g., by a server in a data centre, by a client computing device, by multiple computing devices in a distributed system of a computing resource service provider, or by any suitable electronic client device such as the computing device 1200 of FIG. 12). The process 800 includes a series of operations wherein two puzzles are integrated into a locking script of a PRNG transaction, solutions to the puzzles are integrated into an unlocking script of a seed transaction after the PRNG transaction is committed to the blockchain, a PRNG in the locking script of the PRNG transaction is executed based on using a seed derived from the solutions, thereby producing a pseudorandom number, and a constraint is imposed based on the pseudorandom number produced.

In 802, one or more puzzles, such as the puzzles 410A-10B of FIG. 4 are obtained. In an embodiment, the puzzles can be obtained from the scripts of commitment transactions, such as the commitment transactions 402A-02B. As noted, the puzzles could be sets of logical expressions utilizing one or more operation codes in a scripting language. The puzzles are such that if solutions to the puzzles are received as an input, the puzzle algorithms/logical expressions evaluate to TRUE as a result of execution. A puzzle could be a cryptographic hash puzzle, a proof-of-work puzzle, or some other puzzle with a numeric solution.

In 804, after the commitment transactions have been committed to the blockchain, the puzzles obtained in 802 are combined into the locking script of a PRNG transaction, such as the PRNG transaction 602 of FIG. 6, in a manner such that solutions to the puzzles, such as the solutions 408A-08BB, can be received as input and combined to derive a value that can be used as a seed to the PRNG to generate a pseudorandom number.

In 806, performance of the process 800 proceeds to 808 after it determines that the PRNG transaction has been committed to the blockchain. In 808, once the PRNG transaction has been committed to the blockchain, solutions to the puzzles incorporated in the PRNG transactions are obtained, such as from the solutions 408A-08B of FIG. 4. In some embodiments, the obtaining of the solutions is performed after time $t_c$ (e.g., as shown in FIG. 7) to allow for sufficient time for the parties to provide their solutions.

In 810, a determination is made whether solutions to all of the puzzles incorporated into the locking script of the PRNG transaction have been obtained within the time limit (e.g., t+Δt in FIG. 7). If not all solutions can be obtained, performance of the process 800 proceeds to 812, whereupon a penalty transaction can be validated in order to refund the digital asset associated with the PRNG transaction, as described in the context of FIG. 7. Otherwise, if all solutions are obtained within the time limit, performance of the process 800 proceeds to 814.

In 814, the solutions are incorporated into the unlocking script of a seed transaction such that, in 816, execution of the unlocking script in combination with the locking script causes the solutions to be converted into a seed value (e.g., combining the solution values and performing a SHA256 hash operation on the combined solution values) that, as input to the PRNG in the locking script, causes the PRNG to generate a pseudorandom number. In 818, the pseudorandom number can be used to affect the constraints of the locking script of the PRNG transaction. That is, transfer of control of the digital asset associated with the PRNG transaction is constrained in some manner (e.g., pseudorandom number of signatures accepted, a signature is accepted as valid based in part on whether a pseudorandom number is within a certain range of values, a pseudorandom amount of a digital asset is transferred, etc.) based on the pseudorandom number generated by the PRNG in the PRNG locking script, such as in a manner described in relation to FIG. 11. Note that one or more of the operations performed in 802-18 can be performed in various orders and combinations, including in parallel.

Figure 9:
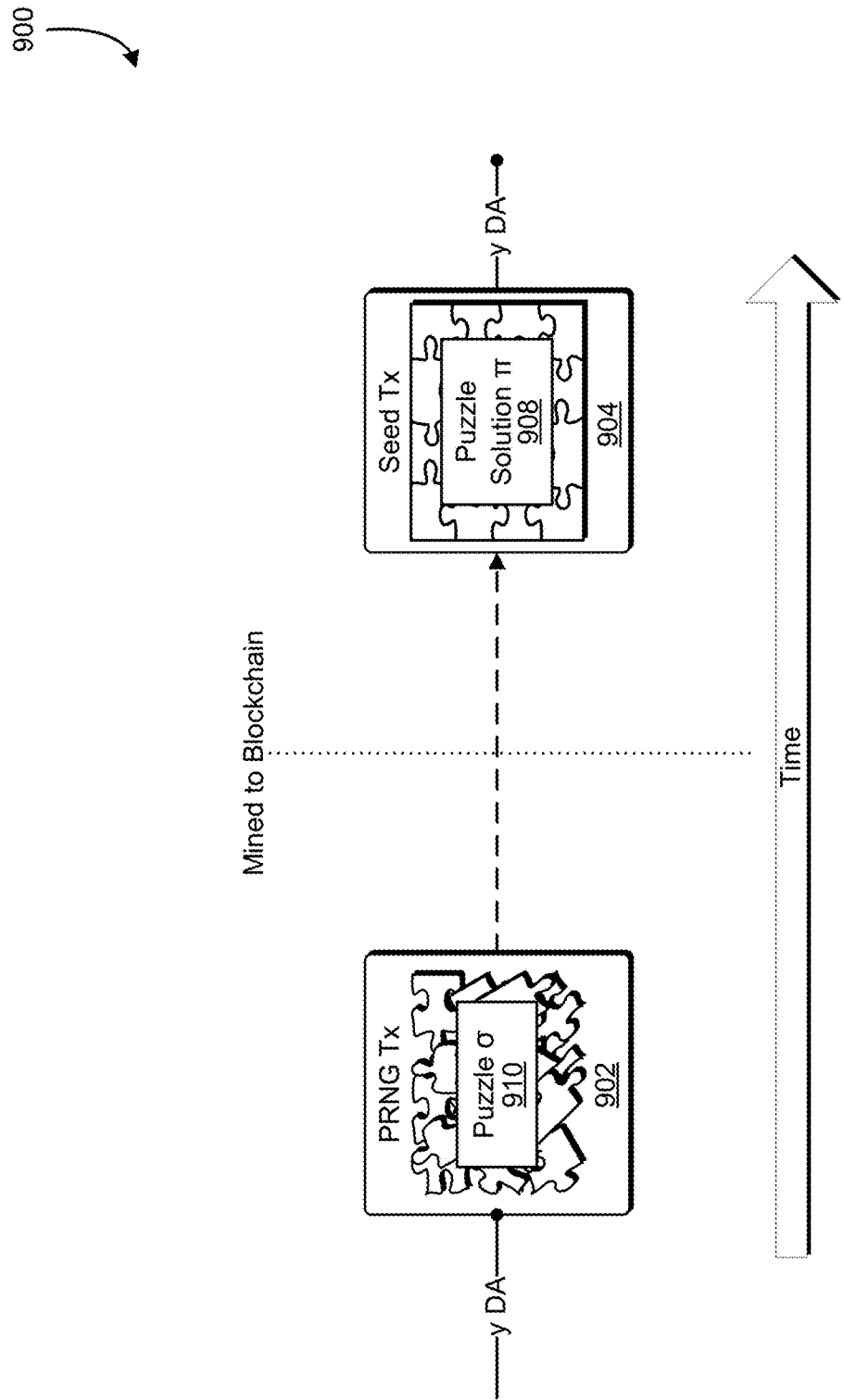
FIG. 9 illustrates an example of a puzzle solution technique for generating a seed in accordance with an embodiment.

FIG. 9 illustrates an example embodiment 900 of the present disclosure. Specifically, FIG. 9 depicts an example of the puzzle solution technique for seed generation. Whereas the commitment solution described in conjunction with FIGS. 4-8 involved two or more commitment parties, the puzzle solution technique depicted in the example embodiment 900 need only have one puzzle solution 908, which can be used to derive a seed to a PRNG transaction 902.

In some embodiments, the PRNG transaction 902 is associated with a digital asset y that is encumbered by a locking script with a constraint (σ←Verify(puzzle, π)) that can be unlocked (e.g., evaluates to TRUE) if a valid solution (π←puzzle solution) to a puzzle 910 is provided in an unlocking script of a seed transaction 904. In some embodiments, the locking script of the PRNG transaction 902 further includes a time limit under which the PRNG transaction 902 can be transferred. That is, in such embodiments, if a valid seed transaction 904 is not validated within a particular time frame (e.g., before the time limit has expired), the digital asset y can be recovered by the creator of the PRNG transaction 902 or, in some embodiments, by another party, with a refund transaction similar to the refund transaction 704 depicted in FIG. 7.

In the puzzle solution technique of the example embodiment 900, the puzzle solution 908 to the puzzle 910 is unknown by parties to the transaction at the time the PRNG transaction 902 is created. In some embodiments, the PRNG transaction 902 is associated with a distribution (such as a portion of a digital asset) that is transferred to the first party to provide the puzzle solution 908, thus providing parties with a reason to attempt to discover the puzzle solution 908 to the puzzle 910. In some cases, the distribution is a distribution external to the blockchain (e.g., real currency). In other cases, the distribution is a portion of the digital asset y. In still other cases, the distribution is a portion of a digital asset of yet another transaction. In some embodiments, the distribution is larger than digital asset y in order to provide a reason to reveal the puzzle solution 908.

In some embodiments, the puzzle 910 is an algorithm comprising a sequence of operations, such as a sequence of operation codes in a scripting language, that if performed on one or inputs, returns an indication of TRUE or FALSE. For example, in embodiments, if the puzzle solution 908 is a valid solution for the puzzle 910, execution of the locking script of the PRNG transaction 902 containing the puzzle 910 will evaluate to TRUE. However, in some embodiments, if the puzzle solution 908 is invalid, execution of the locking script will evaluate to FALSE. A constraint with the puzzle solution technique is that the puzzle solution 908 to the puzzle 910 in this embodiment is not known or determinable at the time the puzzle 910 is created. In some examples, the puzzle 910 is computationally complex (e.g., involves a certain amount of time and/or processing capability over a threshold) such that the solution of the puzzle is unlikely to be determinable prior to a certain time after creation of the PRNG transaction 902.

An example of the puzzle 910 is a proof of work function, such as a cryptographic hash of a future block header of the blockchain at a particular time. Because predicting a future block header of the blockchain becomes more and more difficult the further the particular time is in the future, it is highly unlikely that the puzzle solution 908 to the puzzle 910 will be known by parties to the transaction at the time the PRNG transaction 902 is created and a distribution is associated with providing the proof of work. Note that a future block header can be specified in a variety of ways. For example, the solution could be a hash of the first block header created after a specified date/time in the future. As another example, a future block header could be specified as a first future block header that contains a certain number of transactions in the block. Thus, a proof of work puzzle of a future block header is an example that meets the constraints for the puzzle solution technique.

Accessing to a future block header can be performed by implementing constraints on data in the unlocking scripts to require that the unlocking scripts include block headers, blockchains, or chains of block headers. By implementing such constraints on the data in the unlocking scripts, and by injecting such data into the unlocking scripts at runtime, a transaction can be based on aspects of the blockchain. For example, a block header can be included as data in an unlocking script of a potential seed transaction, and a sequence of operation codes can be executed in a locking script to verify that the data is a valid block header (e.g., size of the script is 80 bytes, that the nBits field of the data is equal to or greater than the blockchain difficulty, and validates that the SHA256 less than or equal to a target value), such as the script shown in Table 1 below.

TABLE 1

| Unlocking Script | Locking Script |
| --- | --- |
| <Data> | OP_DUP |
|  | OP_DUP |
|  | // Check size is 80 bytes |

TABLE 1-continued

| Unlocking Script | Locking Script |
| --- | --- |
| | OP_SIZE <80> OP_EQUALVERIFY<br>// Extract nBits (4 bytes, starting at byte 72)<br><72> <4> OP_SUBSTR<br>// Check Difficulty<br><0x1D00FFFF><br>OP_GREATERTHANOREQUAL<br>OP_VERIFY<br>// Extract nBits<br><72> <4> OP_SUBSTR<br>// Extract Last 3 Bytes<br>OP_DUP <1> <3> OP_SUBSTR<br>// Extract First Byte<br>OP_SWAP <0> <1> OP_SUBSTR<br>// Calculate Target<br><3> OP_SUB OP_LBYTESHIFT<br>// Check against Block Header<br>HASH256<br>OP_OVER OP_HASH256<br>OP_BIGLESSTHANOREQUAL |

In some embodiments, the seed transaction 904 is a transaction created to provide a value, in the form of the puzzle solution 908, usable to derive a seed to a PRNG in the PRNG transaction 902 locking script. In some embodiments, the puzzle solution 908 is a value that if supplied as input to the puzzle 910 via an unlocking script of the seed transaction 904, causes the locking script of the PRNG transaction 902 to evaluate to TRUE as a result of execution. Providing the seed to the PRNG further causes execution of the PRNG to generate a random number. In an embodiment, solving the puzzle 910 is associated with a distribution, such as at least a portion of the digital asset associated with the PRNG transaction 902, as reason to reveal the solution. In this manner, a party that solves the puzzle 910 may be provided a reason to avoid withholding the solution 908, as doing so would increase the likelihood of another party solving the puzzle 910 and claiming the distribution first.

Figure 10:
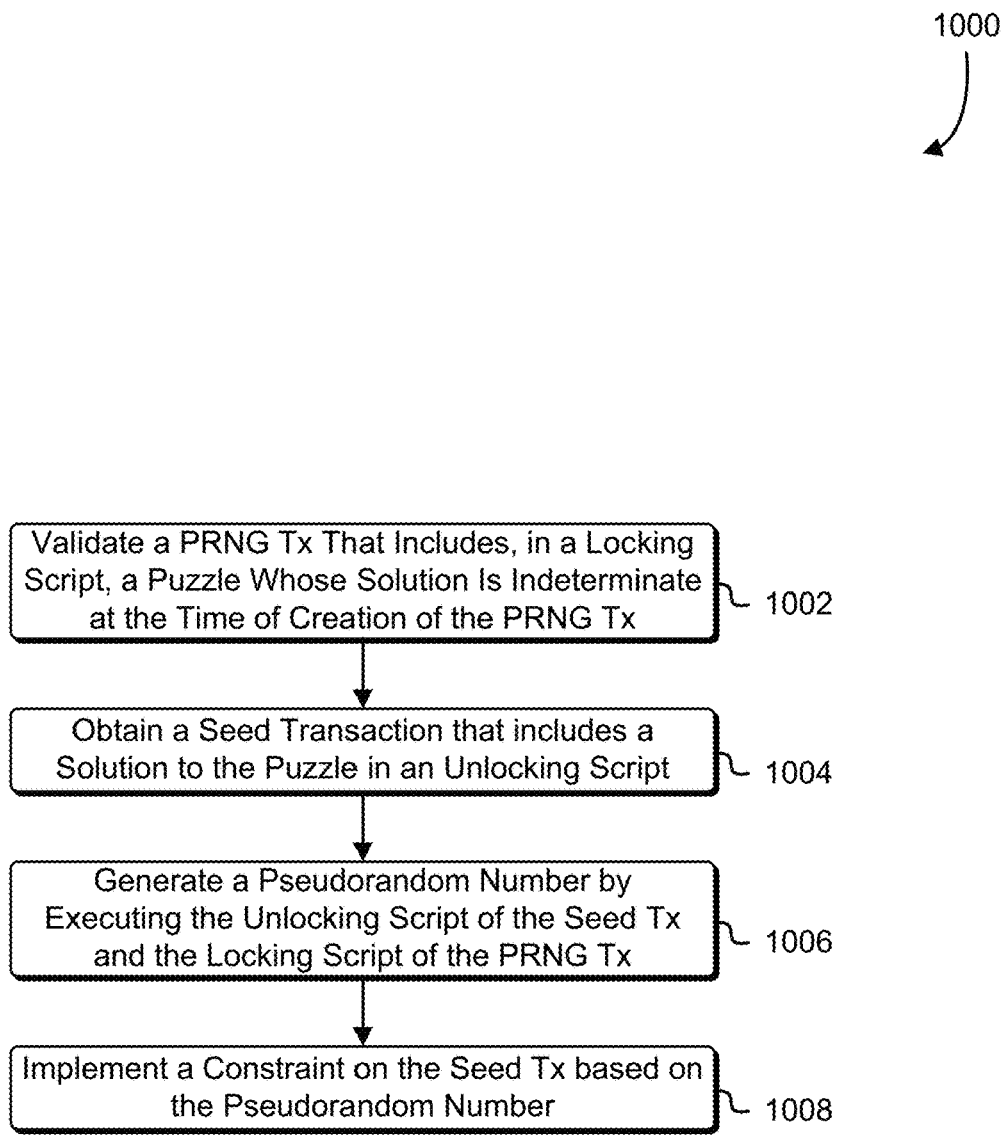
FIG. 10 is a flowchart that illustrates an example of a puzzle solution technique in accordance with an embodiment.

FIG. 10 is a flowchart illustrating an example of a process 1000 for generating a random number in accordance with various embodiments of the puzzle solution technique of the present disclosure. Some or all of the process 1000 (or any other processes described, or variations and/or combinations of those processes) can be performed under the control of one or more computer systems configured with executable instructions and/or other data, and can be implemented as executable instructions executing collectively on one or more processors. The executable instructions and/or other data can be stored on a non-transitory computer-readable storage medium (e.g., a computer program persistently stored on magnetic, optical, or flash media).

For example, some or all of process 1000 can be performed by one or more of computing devices (e.g., by a server in a data centre, by a client computing device, by multiple computing devices in a distributed system of a computing resource service provider, or by any suitable electronic client device such as the computing device 1200 of FIG. 12). The process 1000 includes a series of operations wherein a PRNG transaction that includes a puzzle is validated, and a seed transaction causes a seed to be provided to the PRNG within the locking script of the PRNG transaction. Execution of the PRNG produces a pseudorandom number. A constraint is imposed on the transaction based on the pseudorandom number produced.

In 1002, a PRNG transaction, such as the PRNG transaction 902 of FIG. 9 is validated by a validation node of a blockchain network. In an embodiment, the PRNG transaction includes a puzzle, similar to the puzzle 910, that has a solution that is unknown at the time of creation of the PRNG transaction. For example, in some embodiments, the solution to the puzzle involves data that is not available or determinable until a certain amount of time has elapsed from creation of the PRNG transaction. In 1004, after the PRNG transaction has been committed to the blockchain network, a seed transaction containing the solution to the puzzle (e.g., the puzzle solution 908) in an unlocking script is obtained by the same or different validation node in the blockchain network.

In 1006, this same or different validation node executes the unlocking script of the seed transaction, which causes the solution to be made available as input to the locking script of the PRNG transaction. The validation node then executes the locking script of the PRNG transaction, which takes the solution as input and derives a value based on the solution that is usable by the PRNG to generate a pseudorandom number. In 1008, the pseudorandom number is used to affect the constraints of the locking script of the PRNG transaction. That is, transfer of control of the digital asset associated with the PRNG transaction is constrained in some manner (e.g., pseudorandom number of signatures accepted, a signature is accepted as valid based in part on whether a pseudorandom number is within a certain range of values, a pseudorandom amount of a digital asset is transferred, etc.) based on the pseudorandom number generated by the PRNG in the PRNG locking script, such as in a manner described in relation to FIG. 11. Note that one or more of the operations performed in 1002-08 can be performed in various orders and combinations, including in parallel.

Figure 11:
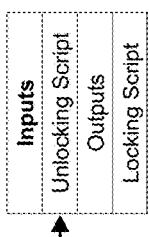
FIG. 11 illustrates an example of randomized smart contract constraints in accordance with an embodiment.
Figure 11:
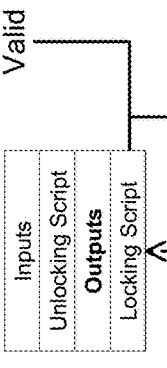
Figure 11:
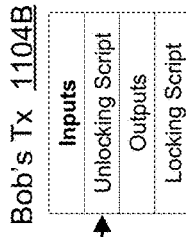
Figure 11:
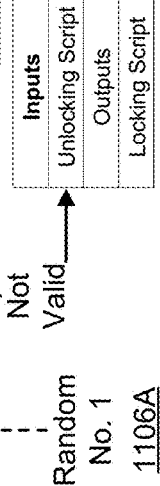
Figure 11:
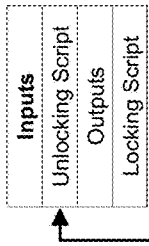
Figure 11:
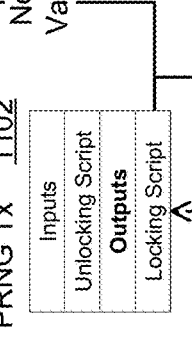
Figure 11:
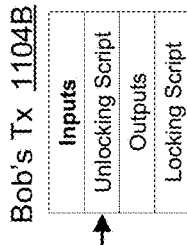
Figure 11:
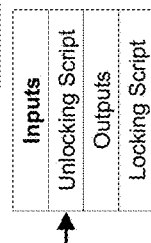

FIG. 11 illustrates an example 1100 of how the PRNG of the embodiments described in the present disclosure could be implemented. Specifically, FIG. 11 depicts an example of a locking script in a PRNG transaction 1102 that as a result of being seeded in a manner described in the embodiments above, randomly produces one of two outcomes. Note that although FIG. 11 depicts only two possible outcomes, the actual number of possible outcomes and the probability of each outcome can be determined by the creator of the PRNG transaction 1102 and encoded in the locking script of the PRNG transaction 1102. Thus, there can be many possible outcomes and probabilities. In a first possible outcome depicted in the example 1100, the random result 1106A is that validation of a first transaction 1104A attempting to unlock the UTXO of the PRNG transaction 1102 is successful but validation of a second transaction 1104B attempting to unlock the UTXO of the PRNG transaction 1102 is unsuccessful. In a second possible outcome, the random result 1106B is that validation of the first transaction 1104A attempting to unlock the UTXO of the PRNG transaction 1102 is unsuccessful but validation of the second transaction 1104B attempting to unlock the UTXO of the PRNG transaction 1102 is unsuccessful.

In some embodiments, the PRNG transaction 1102 is similar to the PRNG transaction 602 or the PRNG transaction 902 described in conjunction with FIGS. 6 and 9, respectively. In some embodiments, the first and second transactions 1104A-04B are similar to the seed transaction 604 or the seed transaction 904 of FIGS. 6 and 9, respectively. That is, each of the first and second transactions 1104A-04B can include one or more solutions to one or more puzzles contained within the locking script of the PRNG transaction 1102. However, because a seed to a pseudorandom number generator is derived from a solution provided to the locking script, even though both the first transaction 1104A and the second transaction 1104B can contain the same solution, the outcome (which in the example 1100 is the determination of which transaction is successfully validated) is pseudorandom. For example, the locking script could be coded to accept Alice's signature on a value from the pseudorandom number generator greater than 5 but accept Bob's signature on a value from the pseudorandom number generator on a value less than or equal to 5.

In some embodiments, the random results 1106A-06B reflect the results of the PRNG of the locking script of the PRNG transaction 1102 having been seeded with one or more puzzle solutions. The tables below illustrate a couple of examples of using a random number generated by a PRNG in a locking script to determine a set of constraints. Table 2 illustrates one example of using a random number generator of the type described in the present disclosure to determine a set of constraints:

TABLE 2

Locking Script

// Constraints to securely have the data provided in the
unlocking script used to calculate the seed
<Script to calculate seed>
<Script to generate random integer from seed>
// Limit the random number to range of 1 to 3
<3> OP_MOD <1> OP_ADD
// Use the random number as the number of signatures
required
<PubK A> <PubK B> <PubK C> <3> OP_CHECKMULTISIG In the above table, a random number is generated based on a seed (e.g., a value derived from a value in stack memory after execution of an unlocking script) and limited to a value between 1 and 3 by performing a modulus 3 operation and adding 1. With the random number on the stack, the OP_CHECKMULTISIG operation checks a number of signatures equal to the random number on the stack. Table 3 illustrates another example of using a random number generator of the type described in the present disclosure to determine a set of constraints:

TABLE 3

Locking Script

// Constraints to securely have the data provided in the
unlocking script used to calculate the seed
<Script to calculate seed>
<Script to generate random integer from seed>
// Limit the random number to range of 0 to 1
<2> OP_MOD
// Selects a constraint based on whether random number is 1
or 0
OP_IF
    <PubK A>
OP_ELSE
    <PubK B>
OP_ENDIF
OP_CHECKSIG In the above table, like the previous script, a random number is generated based on a seed. In this case, the value is limited to a range of 0 or 1. If the random number is 1, a determination is made to check for a valid signature of Alice (e.g., associated with PubK A), whereas if the random number is 0, the determination is made to check for a valid signature of Bob (e.g., associated with PubK B).

Note that in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

FIG. 12 is an illustrative, simplified block diagram of a computing device 1200 that can be used to practice at least one embodiment of the present disclosure. In various embodiments, the computing device 1200 can be used to implement any of the systems illustrated and described above. For example, the computing device 1200 can be configured for use as a data server, a web server, a portable computing device, a personal computer, or any electronic computing device. As shown in FIG. 12, the computing device 1200 could include one or more processors 1202 that, in embodiments, are configured to communicate with and are operatively coupled to a number of peripheral subsystems via a bus subsystem 1204. In some embodiments, these peripheral subsystems include a storage subsystem 1206 comprising a memory subsystem 1208 and a file/disk storage subsystem 1210, one or more user interface input devices 1212, one or more user interface output devices 1214, and a network interface subsystem 1216. Such storage subsystem 1206 could be used for temporary or long-term storage of information.

In some embodiments, the bus subsystem 1204 provides a mechanism for enabling the various components and subsystems of computing device 1200 to communicate with each other as intended. Although the bus subsystem 1204 is shown schematically as a single bus, alternative embodiments of the bus subsystem utilize multiple busses. In some embodiments, the network interface subsystem 1216 provides an interface to other computing devices and networks. The network interface subsystem 1216, in some embodiments, serves as an interface for receiving data from and transmitting data to other systems from the computing device 1200. In some embodiments, the bus subsystem 1204 is utilized for communicating data such as details, search terms, and so on.

In some embodiments, the user interface input devices 1212 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1200. In some embodiments, the one or more user interface output devices 1214 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1200. The one or more user interface output devices 1214 can be used, for example, to present user interfaces to facilitate user interaction with applications performing processes described and variations therein, when such interaction may be appropriate.

In some embodiments, the storage subsystem 1206 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1206. These application modules or instructions can be executed by the one or more processors 1202. In various embodiments, the storage subsystem 1206 additionally provides a repository for storing data used in accordance with the present disclosure. In some embodiments, the storage subsystem 1206 comprises a memory subsystem 1208 and a file/disk storage subsystem 1210.

In embodiments, the memory subsystem 1208 includes a number of memories, such as a main random access memory (RAM) 1218 for storage of instructions and data during program execution and/or a read only memory (ROM) 1220, in which fixed instructions can be stored. In some embodiments, the file/disk storage subsystem 1210 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1200 includes at least one local clock 1224. The local clock 1224, in some embodiments, is a counter that represents the number of ticks that have transpired from a particular starting date and, in some embodiments, is located integrally within the computing device 1200. In various embodiments, the local clock 1224 is used to synchronize data transfers in the processors for the computing device 1200 and the subsystems included therein at specific clock pulses and can be used to coordinate synchronous operations between the computing device 1200 and other systems in a data centre. In another embodiment, the local clock is a programmable interval timer.

The computing device 1200 could be of any of a variety of types, including a portable computer device, tablet computer, a workstation, or any other device described below. Additionally, the computing device 1200 can include another device that, in some embodiments, can be connected to the computing device 1200 through one or more ports (e.g., USB, a headphone jack, Lightning connector, etc.). In embodiments, such a device includes a port configured to accept a fibre-optic connector. Accordingly, in some embodiments, this device is configured to convert optical signals to electrical signals that are transmitted through the port connecting the device to the computing device 1200 for processing. Due to the ever-changing nature of computers and networks, the description of the computing device 1200 depicted in FIG. 12 is intended only as a specific example for purposes of illustrating the preferred embodiment of the device. Many other configurations having more or fewer components than the system depicted in FIG. 12 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising", "having", "including", and "containing" are to be construed as open-ended terms (i.e., meaning "including, but not limited to") unless otherwise noted. The term "connected", when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset", unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C", or "at least one of A, B and C", unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like do not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

SUMMARY

Techniques described and suggested in the present disclosure extend the functionality of the blockchain without disrupting the properties of the blockchain that ensure the integrity of the data stored within the blockchain data structure. For example, the techniques described in the present disclosure improve the field of computing, specifically the field of smart contracts, by providing increased flexibility for implementing constraints on transactions. Additionally, techniques described and suggested in the present disclosure may improve the functionality of blockchain networks by enabling the generation of pseudorandom numbers in scripts. Moreover, techniques described and suggested in the present disclosure are necessarily rooted in computer technology in order to overcome problems specifically arising with the lack of random number generation functionality in blockchain script operation codes.

The invention claimed is:

1. A computer-implemented method comprising:
    validating, by one or more network nodes having one or more processors, a third transaction that includes, in a third locking script, a first puzzle, a second puzzle, and a pseudorandom number generator (PRNG), wherein solutions to the first and second puzzles are not known or fixed at a time that the third locking script is created, wherein:
        the first puzzle is included, in a first transaction, in a first locking script that encumbers, with a first condition fulfillable by a solution to the first puzzle, transfer of control of a first digital asset, wherein the first transaction is created by a first party;
        the second puzzle is included, in a second transaction, in a second locking script that encumbers, with a second condition fulfillable by a solution to the second puzzle, transfer of control of a second digital asset, wherein the second transaction is created by a second party different from the first party;
        the first transaction and the second transaction are committed to a blockchain; and
        the third transaction is associated with a third digital asset;
    obtaining a fourth transaction that includes, in an unlocking script, solutions to the first and second puzzles;
    generating, by the PRNG, a pseudorandom number by executing the unlocking script and the third locking script, wherein a pseudorandom seed is derived from the solutions and input into the PRNG; and
    transferring control of the third digital asset based at least in part on the pseudorandom number.

2. The computer-implemented method according to claim 1, wherein the first party has access to the solution to the first puzzle prior to creation of the first transaction.

3. The computer-implemented method according to claim 1, wherein:
    the first locking script includes a time constraint;
    on a condition that the time constraint is fulfilled, validation of a transaction that includes the solution to the first puzzle causes control of the first digital asset to transfer to a first entity; and
    on a condition that the time constraint is unfulfilled, validation of a penalty transaction causes the control of the first digital asset to transfer to a second entity different from the first entity.

4. The computer-implemented method according to claim 3, wherein the time constraint is that the solution to the first puzzle is revealed before a time limit is exceeded.

5. The computer-implemented method according to claim 1, wherein validating the third transaction is performed before fulfilment of the first condition and the second condition.

6. The computer-implemented method according to claim 1, wherein the first puzzle is a cryptographic hash puzzle.

7. The computer-implemented method according to claim 1, wherein:
    the first puzzle is a set of operation codes in a locking script of the first transaction; and
    execution of the set of operation codes evaluates to true as a result of receiving the solution to the first puzzle as input.

8. The computer-implemented method according to claim 1, wherein solving the first puzzle and the second puzzle is more computationally difficult than verifying the solution to the first puzzle and the solution to the second puzzle.

9. The computer-implemented method according to claim 1, wherein generating the pseudorandom number includes deriving a seed value based at least in part on the solution to the first puzzle and the solution to the second puzzle.

10. The computer-implemented method according to claim 1, further comprising validating a seed transaction that includes the solution to the first puzzle and the solution to the second puzzle.

11. The computer-implemented method according to claim 10, wherein transferring control of the third digital asset includes:

on a condition that the pseudorandom number is a first value, validation of the seed transaction is successful; and on a condition that the pseudorandom number is a second value, different from the first value, validation of the seed transaction is unsuccessful.

12. The computer-implemented method according to claim 11, wherein an unlocking script of the seed transaction includes the solution to the first puzzle and the solution to the second puzzle.

13. The computer-implemented method according to claim 1, further comprising validating a refund transaction to return control of the third digital asset to an entity that created the third transaction.

14. The computer-implemented method according to claim 13, wherein validating the refund transaction occurs on a condition that successful validation of a seed transaction containing the solution to the first puzzle and the solution to the second puzzle does not occur within a certain period of time.

15. A system, comprising:
a processor; and
memory including executable instructions that, as a result of execution by the processor, causes the system to:
validate a third transaction that includes, in a third locking script, a first puzzle, a second puzzle, and a pseudorandom number generator (PRNG), wherein solutions to the first and second puzzles are not known or fixed at a time that the third locking script is created, wherein:
the first puzzle is included, in a first transaction, in a first locking script that encumbers, with a first condition fulfillable by the solution to the first puzzle, transfer of control of a first digital asset, wherein the first transaction is created by a first party;
the second puzzle is included, in a second transaction, in a second locking script that encumbers, with a second condition fulfillable by the solution to the second puzzle, transfer of control of a second digital asset, wherein the second transaction is created by a second party different from the first party;
the first transaction and the second transaction are committed to a blockchain; and the third transaction is associated with a third digital asset;
obtain a fourth transaction that includes, in an unlocking script, solutions to the first and second puzzles;
generate, by the PRNG, a pseudorandom number by executing the unlocking script and the third locking script, wherein a pseudorandom seed is derived from the solutions and input into the PRNG; and
transfer control of the third digital asset based at least in part on the pseudorandom number.

16. A non-transitory computer-readable storage medium having stored thereon executable instructions that, as a result of being executed by a processor of a computer system, cause the computer system to
validate a third transaction that includes, in a third locking script, a first puzzle, a second puzzle, and a pseudorandom number generator (PRNG), wherein solutions to the first and second puzzles are not known or fixed at a time that the third locking script is created, wherein:
the first puzzle is included, in a first transaction, in a first locking script that encumbers, with a first condition fulfillable by the solution to the first puzzle, transfer of control of a first digital asset, wherein the first transaction is created by a first party;
the second puzzle is included, in a second transaction, in a second locking script that encumbers, with a second condition fulfillable by the solution to the second puzzle, transfer of control of a second digital asset, wherein the second transaction is created by a second party different from the first party;
the first transaction and the second transaction are committed to a blockchain; and
the third transaction is associated with a third digital asset;
obtain a fourth transaction that includes, in an unlocking script, solutions to the first and second puzzles;
generate, by the PRNG, a pseudorandom number by executing the unlocking script and the third locking script, wherein a pseudorandom seed is derived from the solutions and input into the PRNG; and
transfer control of the third digital asset based at least in part on the pseudorandom number.

\* \* \* \* \*